US012738169B2

(12) United States Patent
Ali et al.

(10) Patent No.: US 12,738,169 B2
(45) Date of Patent: Sep. 15, 2026

(54) AUTOMATED PREFLIGHT EVALUATION OF AN UNMANNED AERIAL VEHICLE CONFIGURATION

(71) Applicant: SKYGRID, LLC, Austin, TX (US)

(72) Inventors: Syed Mohammad Ali, Leander, TX (US); Lowell L. Duke, Austin, TX (US); Zehra Akbar, Leander, TX (US); Syed Mohammad Amir Husain, Georgetown, TX (US); Taylor R. Schmidt, Austin, TX (US); Milton Lopez, Round Rock, TX (US); Ravi Teja Pinnamaneni, Austin, TX (US)

(73) Assignee: SkyGrid, LLC, Austin, TX (US)

( * ) Notice: Subject to any disclaimer, the term of this patent is extended or adjusted under 35 U.S.C. 154(b) by 407 days.

(21) Appl. No.: 18/174,290

(22) Filed: Feb. 24, 2023

(65) Prior Publication Data

US 2024/0078913 A1 Mar. 7, 2024

Related U.S. Application Data

(60) Provisional application No. 63/316,397, filed on Mar. 3, 2022.

(51) Int. Cl.

| | |
|---|---|
| ***G05D 1/00*** | (2024.01) |
| ***G08G 5/22*** | (2025.01) |
| ***G08G 5/34*** | (2025.01) |
| ***G08G 5/55*** | (2025.01) |
| ***G08G 5/57*** | (2025.01) |

(52) U.S. Cl.

CPC ................ *G08G 5/22* (2025.01); *G08G 5/34* (2025.01); *G08G 5/55* (2025.01); *G08G 5/57* (2025.01)

(58) Field of Classification Search

CPC .. G08G 5/22; G08G 5/34; G08G 5/55; G08G 5/57; G08G 5/26; G08G 5/32; G06Q 10/063; G06Q 50/40

USPC ........................................................ 701/120

See application file for complete search history.

(56) References Cited

U.S. PATENT DOCUMENTS

| | | | |
|---|---|---|---|
| 2016/0111006 A1 | 4/2016 | Srivastava et al. | |
| 2017/0154535 A1* | 6/2017 | Downey ................ | G05D 1/101 |
| 2018/0165968 A1 | 6/2018 | Clark et al. | |
| 2019/0245698 A1* | 8/2019 | Dix ..................... | H04L 41/0803 |

(Continued)

FOREIGN PATENT DOCUMENTS

KR 101946416 B1 2/2019

OTHER PUBLICATIONS

International Search Report and Written Opinion, PCT/US2023/063189, May 30, 2023, 12 pages.

*Primary Examiner* — Aniss Chad
*Assistant Examiner* — Hussam Aldeen Alzateemeh
(74) *Attorney, Agent, or Firm* — Harrity & Harrity, LLP

(57) ABSTRACT

Methods, systems, apparatuses, and computer program products for automated preflight evaluation of an unmanned aerial vehicle (UAV) configuration are disclosed. In a particular embodiment, automated preflight evaluation of an UAV configuration includes a preflight controller retrieving information about a UAV configuration selected to perform a mission in accordance with one or more mission parameters. In this embodiment, the preflight controller uses the retrieved information to assess an ability of the UAV configuration to perform the mission in accordance with the one or more mission parameters.

20 Claims, 20 Drawing Sheets

(56) References Cited

U.S. PATENT DOCUMENTS

| | | | | |
|---|---|---|---|---|
| 2021/0343158 | A1 | 11/2021 | Gonzalez et al. | |
| 2023/0334993 | A1* | 10/2023 | Downey | H04L 67/12 |
| 2024/0118689 | A1* | 4/2024 | Jobanputra | G05D 1/104 |

* cited by examiner

AUTOMATED PREFLIGHT EVALUATION OF AN UNMANNED AERIAL VEHICLE CONFIGURATION

RELATED APPLICATION

This application claims priority to U.S. Provisional Patent Application No. 63/316,397, filed on Mar. 3, 2022, which is incorporated herein by reference in its entirety.

BACKGROUND

An Unmanned Aerial Vehicle (UAV) is a term used to describe an aircraft with no pilot on-board the aircraft. The use of UAVs is growing in an unprecedented rate, and it is envisioned that UAVs will become commonly used for package delivery and passenger air taxis. However, as UAVs become more prevalent in the airspace, there is a need to regulate air traffic and ensure the safe navigation of the UAVs.

The Unmanned Aircraft System Traffic Management (UTM) is an initiative sponsored by the Federal Aviation Administration (FAA) to enable multiple beyond visual line-of-sight drone operations at low altitudes (under 400 feet above ground level (AGL)) in airspace where FAA air traffic services are not provided. However, a framework that extends beyond the 400 feet AGL limit is needed. For example, unmanned aircraft that would be used by package delivery services and air taxis may need to travel at altitudes above 400 feet. Such a framework requires technology that will allow the FAA to safely regulate unmanned aircraft.

SUMMARY

Methods, systems, apparatuses, and computer program products for automated preflight evaluation of an unmanned aerial vehicle (UAV) configuration are disclosed. In a particular embodiment, automated preflight evaluation of an UAV configuration includes a preflight controller retrieving information about a UAV configuration selected to perform a mission in accordance with one or more mission parameters. In this embodiment, the preflight controller uses the retrieved information to assess an ability of the UAV configuration to perform the mission in accordance with the one or more mission parameters.

In a particular embodiment, automated preflight evaluation of an UAV configuration includes a preflight controller receiving from a user, a selection of a UAV configuration to perform a mission in accordance with one or more mission parameters. In this embodiment, the preflight controller assesses an ability of the UAV configuration to perform the mission in accordance with the one or more mission parameters.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
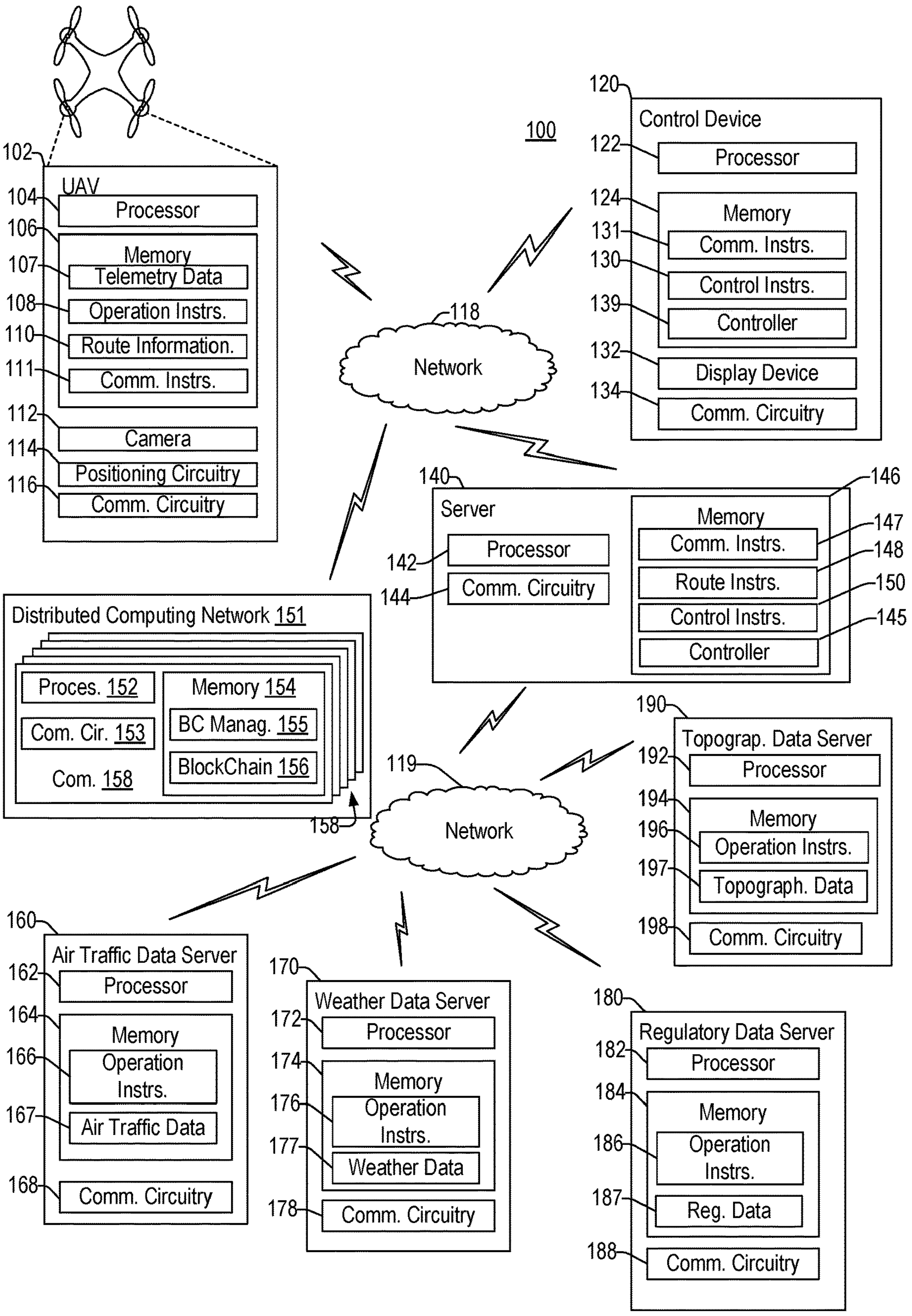
FIG. 1 is a block diagram illustrating a particular implementation of a system for automated preflight evaluation of an unmanned aerial vehicle configuration, according to at least one embodiment of the present invention.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

Exemplary methods, apparatuses, and computer program products for automated preflight evaluation of an unmanned aerial vehicle configuration in accordance with the present invention are described with reference to the accompanying drawings, beginning with FIG. 1. FIG. 1 sets forth a diagram of a system 100 configured for automated preflight evaluation of an UAV configuration according to embodiments of the present disclosure. The system 100 of FIG. 1 includes an unmanned aerial vehicle (UAV) 102, a control device 120, a server 140, a distributed computing network 151, an air traffic data server 160, a weather data server 170, a regulatory data server 180, and a topographical data server 190.

A UAV, commonly known as a drone, is a type of powered aerial vehicle that does not carry a human operator and uses aerodynamic forces to provide vehicle lift. UAVs are a component of an unmanned aircraft system (UAS), which typically include at least a UAV, a control device, and a system of communications between the two. The flight of a UAV may operate with various levels of autonomy including under remote control by a human operator or autonomously by onboard or ground computers. Although a UAV may not include a human operator pilot, some UAVs, such as passenger drones drone taxi, flying taxi, or pilotless helicopter carry human passengers.

For ease of illustration, the UAV 102 is illustrated as one type of drone. However, any type of UAV may be used in accordance with embodiments of the present disclosure and unless otherwise noted, any reference to a UAV in this application is meant to encompass all types of UAVs. Readers of skill in the art will realize that the type of drone that is selected for a particular mission or excursion may depend on many factors, including but not limited to the type of payload that the UAV is required to carry, the distance that the UAV must travel to complete its assignment, and the types of terrain and obstacles that are anticipated during the assignment.

In FIG. 1, the UAV 102 includes a processor 104 coupled to a memory 106, a camera 112, positioning circuitry 114, and communication circuitry 116. The communication circuitry 116 includes a transmitter and a receiver or a combination thereof (e.g., a transceiver). In a particular implementation, the communication circuitry 116 (or the processor 104) is configured to encrypt outgoing message(s) using a private key associated with the UAV 102 and to decrypt incoming message(s) using a public key of a device (e.g., the control device 120 or the server 140) that sent the incoming message(s). As will be explained further below, the outgoing and incoming messages may be transaction messages that include information associated with the UAV. Thus, in this implementation, communications between the UAV 102, the control device 120, and the server 140 are secure and trustworthy (e.g., authenticated).

The camera 112 is configured to capture image(s), video, or both, and can be used as part of a computer vision system. For example, the camera 112 may capture images or video and provide the video or images to a pilot of the UAV 102 to aid with navigation. Additionally, or alternatively, the camera 112 may be configured to capture images or video to be used by the processor 104 during performance of one or more operations, such as a landing operation, a takeoff operation, or object/collision avoidance, as non-limiting examples. Although a single camera 112 is shown in FIG. 1, in alternative implementations more and/or different sensors may be used (e.g., infrared, LIDAR, SONAR, etc.).

The positioning circuitry 114 is configured to determine a position of the UAV 102 before, during, and/or after flight. For example, the positioning circuitry 114 may include a global positioning system (GPS) interface or sensor that determines GPS coordinates of the UAV 102. The positioning circuitry 114 may also include gyroscope(s), accelerometer(s), pressure sensor(s), other sensors, or a combination thereof, that may be used to determine the position of the UAV 102.

The processor 104 is configured to execute instructions stored in and retrieved from the memory 106 to perform various operations. For example, the instructions include operation instructions 108 that include instructions or code that cause the UAV 102 to perform flight control operations. The flight control operations may include any operations associated with causing the UAV to fly from an origin to a destination. For example, the flight control operations may include operations to cause the UAV to fly along a designated route (e.g., based on route information 110, as further described herein), to perform operations based on control data received from one or more control devices, to take off, land, hover, change altitude, change pitch/yaw/roll angles, or any other flight-related operations. The UAV 102 may include one or more actuators, such as one or more flight control actuators, one or more thrust actuators, etc., and execution of the operation instructions 108 may cause the processor 104 to control the one or more actuators to perform the flight control operations. The one or more actuators may include one or more electrical actuators, one or more magnetic actuators, one or more hydraulic actuators, one or more pneumatic actuators, one or more other actuators, or a combination thereof.

The route information 110 may indicate a flight path for the UAV 102 to follow. For example, the route information 110 may specify a starting point (e.g., an origin) and an ending point (e.g., a destination) for the UAV 102. Additionally, the route information may also indicate a plurality of waypoints, zones, areas, regions between the starting point and the ending point. The route information 110 may include a plurality of mission modes and flight paths linking the mission modes to one another.

The route information 110 may also indicate a corresponding set of control devices for various points, zones, regions, areas of the flight path. The indicated sets of control devices may be associated with a pilot (and optionally one or more backup pilots) assigned to have control over the UAV 102 while the UAV 102 is in each zone. The route information 110 may also indicate time periods during which the UAV is scheduled to be in each of the zones (and thus time periods assigned to each pilot or set of pilots).

In the example of FIG. 1, the memory 106 of the UAV 102 also includes communication instructions 111 that when executed by the processor 104 cause the processor 104 to transmit to the distributed computing network 151, transaction messages that include telemetry data 107. Telemetry data may include any information that could be useful to identifying the location of the UAV, the operating parameters of the UAV, or the status of the UAV. Examples of telemetry data include but are not limited to GPS coordinates, instrument readings (e.g., airspeed, altitude, altimeter, turn, heading, vertical speed, attitude, turn and slip), and operational readings (e.g., pressure gauge, fuel gauge, battery level).

The control device 120 includes a processor 122 coupled to a memory 124, a display device 132, and communication circuitry 134. The display device 132 may be a liquid crystal display (LCD) screen, a touch screen, another type of display device, or a combination thereof. The communication circuitry 134 includes a transmitter and a receiver or a combination thereof (e.g., a transceiver). In a particular implementation, the communication circuitry 134 (or the processor 122 is configured to encrypt outgoing message(s) using a private key associated with the control device 120 and to decrypt incoming message(s) using a public key of a device (e.g., the UAV 102 or the server 140 that sent the incoming message(s). Thus, in this implementation, communication between the UAV 102, the control device 120, and the server 140 are secure and trustworthy (e.g., authenticated).

The processor 122 is configured to execute instructions from the memory 124 to perform various operations. The instructions also include control instructions 130 that include instructions or code that cause the control device 120 to generate control data to transmit to the UAV 102 to enable the control device 120 to control one or more operations of the UAV 102 during a particular time period, as further described herein.

The memory 124 of the control device 120 also includes a preflight controller 139 configured for multi-objective mission execution. In a particular embodiment, the preflight controller 139 includes computer program instructions that when executed by the processor 122 cause the processor 122 to carry out the operations of: retrieving information about a UAV configuration selected to perform a mission in accordance with one or more mission parameters; and using the retrieved information to assess an ability of the UAV configuration to perform the mission in accordance with the one or more mission parameters. In another embodiment, the preflight controller 139 includes computer program instructions that when executed by the processor 122 cause the processor 122 to carry out the operations of: receiving from a user, a selection of a UAV configuration to perform a mission in accordance with one or more mission parameters; and assessing an ability of the UAV configuration to perform the mission in accordance with the one or more mission parameters.

In the example of FIG. 1, the memory 124 of the control device 120 also includes communication instructions 131 that when executed by the processor 122 cause the processor 122 to transmit to the distributed computing network 151, transaction messages that include control instructions 130 that are directed to the UAV 102. In a particular embodiment, the transaction messages are also transmitted to the UAV and the UAV takes action (e.g., adjusting flight operations), based on the information (e.g., control data) in the message.

The server 140 includes a processor 142 coupled to a memory 146, and communication circuitry 144. The communication circuitry 144 includes a transmitter and a receiver or a combination thereof (e.g., a transceiver). In a particular implementation, the communication circuitry 144 (or the processor 142) is configured to encrypt outgoing message(s) using a private key associated with the server 140 and to decrypt incoming message(s) using a public key of a device (e.g., the UAV 102 or the control device 120) that sent the incoming message(s). As will be explained further below, the outgoing and incoming messages may be transaction messages that include information associated with the UAV. Thus, in this implementation, communication between the UAV 102, the control device 120, and the server 140 are secure and trustworthy (e.g., authenticated).

The processor 142 is configured to execute instructions from the memory 146 to perform various operations. The instructions include route instructions 148 comprising computer program instructions for aggregating data from disparate data servers, virtualizing the data in a map, generating a cost model for paths traversed in the map, and autonomously selecting the optimal route for the UAV based on the cost model. For example, the route instructions 148 are configured to partition a map of a region into geographic cells, calculate a cost for each geographic cell, wherein the cost is a sum of a plurality of weighted factors, determine a plurality of flight paths for the UAV from a first location on the map to a second location on the map, wherein each flight path traverses a set of geographic cells, determine a cost for each flight path based on the total cost of the set of geographic cells traversed, and select, in dependence upon the total cost of each flight path, an optimal flight path from the plurality of flight paths. The route instructions 148 are further configured to obtain data from one or more data servers regarding one or more geographic cells, calculate, in dependence upon the received data, an updated cost for each geographic cell traversed by a current flight path, calculate a cost for each geographic cell traversed by at least one alternative flight path from the first location to the second location, determine that at least one alternative flight path has a total cost that is less than the total cost of the current flight path, and select a new optimal flight path from the at least one alternative flight paths. The route instructions 148 may also include instructions for storing the parameters of the selected optimal flight path as route information 110. For example, the route information may include waypoints marked by GPS coordinates, arrival times for waypoints, pilot assignments. The route instructions 148 may also include instructions receiving, by a server in a UAV transportation ecosystem, disinfection area data; accessing, by the server, UAV parameters for a type of UAV; determining, by the server in dependence upon the disinfection area data and the UAV parameters, a number of UAVs needed to complete a coordinated aerial disinfection of a disinfection area within a time limit; and partitioning, by the server, the disinfection area into a plurality of partitions, wherein the number of partitions is equal to the number of UAVs. The server 140 may be configured to transmit the route information 110, including disinfection route information, to the UAV 102.

The instructions may also include control instructions 150 that include instructions or code that cause the server 140 to generate control data to transmit to the UAV 102 to enable the server 140 to control one or more operations of the UAV 102 during a particular time period, as further described herein.

The memory 146 of the server 120 also includes a preflight controller 145 configured for multi-objective mission execution. In a particular embodiment, the preflight controller 145 includes computer program instructions that when executed by the processor 142 cause the processor 142 to carry out the operations of: retrieving information about a UAV configuration selected to perform a mission in accordance with one or more mission parameters; and using the retrieved information to assess an ability of the UAV configuration to perform the mission in accordance with the one or more mission parameters. In another embodiment, the preflight controller 139 includes computer program instructions that when executed by the processor 122 cause the processor 122 to carry out the operations of: receiving from a user, a selection of a UAV configuration to perform a mission in accordance with one or more mission parameters; and assessing an ability of the UAV configuration to perform the mission in accordance with the one or more mission parameters.

In the example of FIG. 1, the UAV 102, the control device 120, and the server 140, each include a preflight controller (113, 139, 145). However, readers of skill in the art will realize that the preflight controller may be included in any combination of the UAV 102, the control device 120, and the server 140. For example, in a particular embodiment, the preflight controller is only included in the UAV 102. As another example, the preflight controller may only be included in the control device 120.

In the example of FIG. 1, the memory 146 of the server 140 also includes communication instructions 147 that when executed by the processor 142 cause the processor 142 to transmit to the distributed computing network 151, transaction messages that include control instructions 150 that are directed to the UAV 102.

The distributed computing network 151 of FIG. 1 includes a plurality of computers 157. An example computer 158 of the plurality of computers 157 is shown and includes a processor 152 coupled to a memory 154, and communication circuitry 153. The communication circuitry 153 includes a transmitter and a receiver or a combination thereof (e.g., a transceiver). In a particular implementation, the communication circuitry 153 (or the processor 152) is configured to encrypt outgoing message(s) using a private key associated with the computer 158 and to decrypt incoming message(s) using a public key of a device (e.g., the UAV 102, the control device 120, or the server 140) that sent the incoming message(s). As will be explained further below, the outgoing and incoming messages may be transaction messages that include information associated with the UAV. Thus, in this implementation, communication between the UAV 102, the control device 120, the server 140, and the distributed computing network 151 are secure and trustworthy (e.g., authenticated).

The processor 152 is configured to execute instructions from the memory 154 to perform various operations. The memory 154 includes a blockchain manager 155 that includes computer program instructions for operating an UAV. Specifically, the blockchain manager 155 includes computer program instructions that when executed by the processor 152 cause the processor 152 to receive a transaction message associated with a UAV. For example, the blockchain manager may receive transaction messages from the UAV 102, the control device 120, or the server 140. The blockchain manager 155 also includes computer program instructions that when executed by the processor 152 cause the processor 152 to use the information within the transaction message to create a block of data; and store the created block of data in a blockchain data structure 156 associated with the UAV.

The blockchain manager may also include instructions for accessing information regarding an unmanned aerial vehicle (UAV). For example, the blockchain manager 155 also includes computer program instructions that when executed by the processor 152 cause the processor to receive from a device, a request for information regarding the UAV; in response to receiving the request, retrieve from a blockchain data structure associated with the UAV, data associated with the information requested; and based on the retrieved data, respond to the device.

The UAV 102, the control device 120, and server 140 are communicatively coupled via a network 118. For example, the network 118 may include a satellite network or another type of network that enables wireless communication between the UAV 102, the control device 120, the server 140, and the distributed computing network 151. In an alternative implementation, the control device 120 and the server 140 communicate with the UAV 102 via separate networks (e.g., separate short-range networks).

In some situations, minimal (or no) manual control of the UAV 102 may be performed, and the UAV 102 may travel from the origin to the destination without incident. However, in some situations, one or more pilots may control the UAV 102 during a time period, such as to perform object avoidance or to compensate for an improper UAV operation. In some situations, the UAV 102 may be temporarily stopped, such as during an emergency condition, for recharging, for refueling, to avoid adverse weather conditions, responsive to one or more status indicators from the UAV 102, etc. In some implementations, due to the unscheduled stop, the route information 110 may be updated (e.g., via a subsequent blockchain entry, as further described herein) by route instructions 148 executing on the UAV 102, the control device 120, or the server 140). The updated route information may include updated waypoints, updated time periods, and updated pilot assignments.

In a particular implementation, the route information is exchanged using a blockchain data structure. The blockchain data structure may be shared in a distributed manner across a plurality of devices of the system 100, such as the UAV 102, the control device 120, the server 140, and any other control devices or UAVs in the system 100. In a particular implementation, each of the devices of the system 100 stores an instance of the blockchain data structure in a local memory of the respective device. In other implementations, each of the devices of the system 100 stores a portion of the shared blockchain data structure and each portion is replicated across multiple of the devices of the system 100 in a manner that maintains security of the shared blockchain data structure as a public (i.e., available to other devices) and incorruptible (or tamper evident) ledger. Alternatively, as in FIG. 1, the blockchain 156 is stored in a distributed manner in the distributed computing network 151.

Figure 3A:
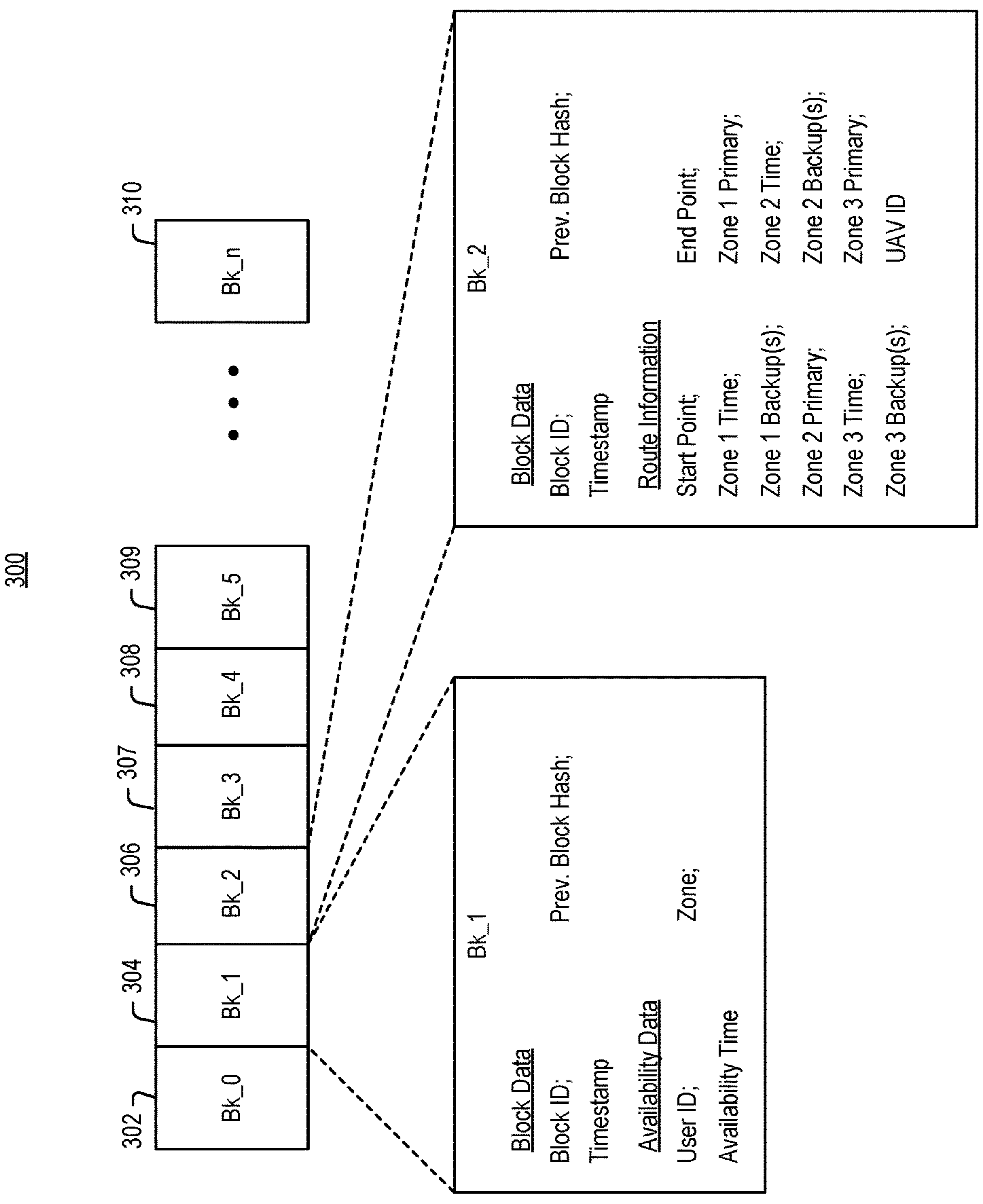
FIG. 3A a block diagram illustrating a particular implementation of the blockchain used by the systems of FIGS. 1-2 to record data associated with an unmanned aerial vehicle, according to at least one embodiment of the present invention.
Figure 3B:
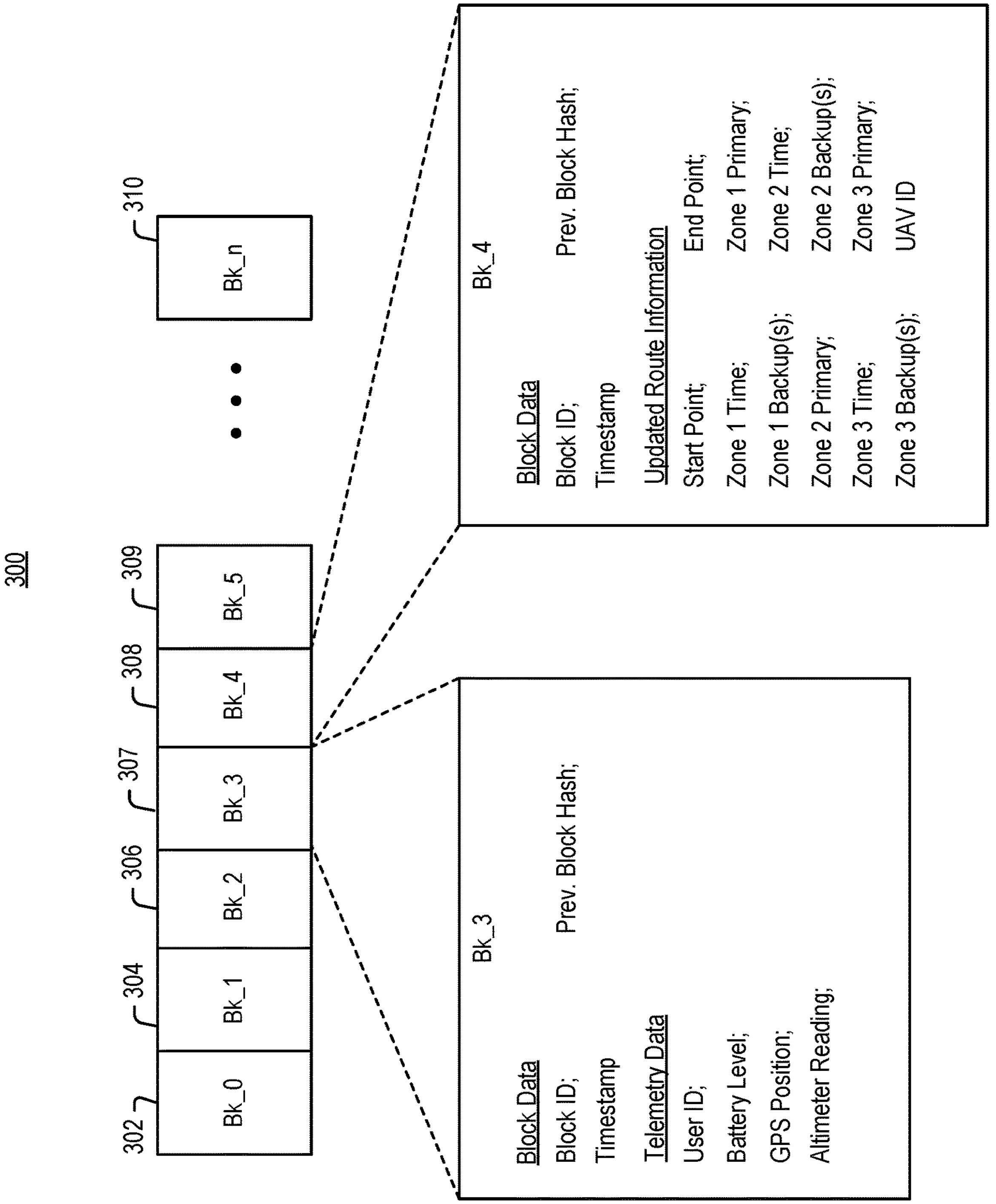
FIG. 3B is an additional view of the blockchain of FIG. 3A.
Figure 3C:
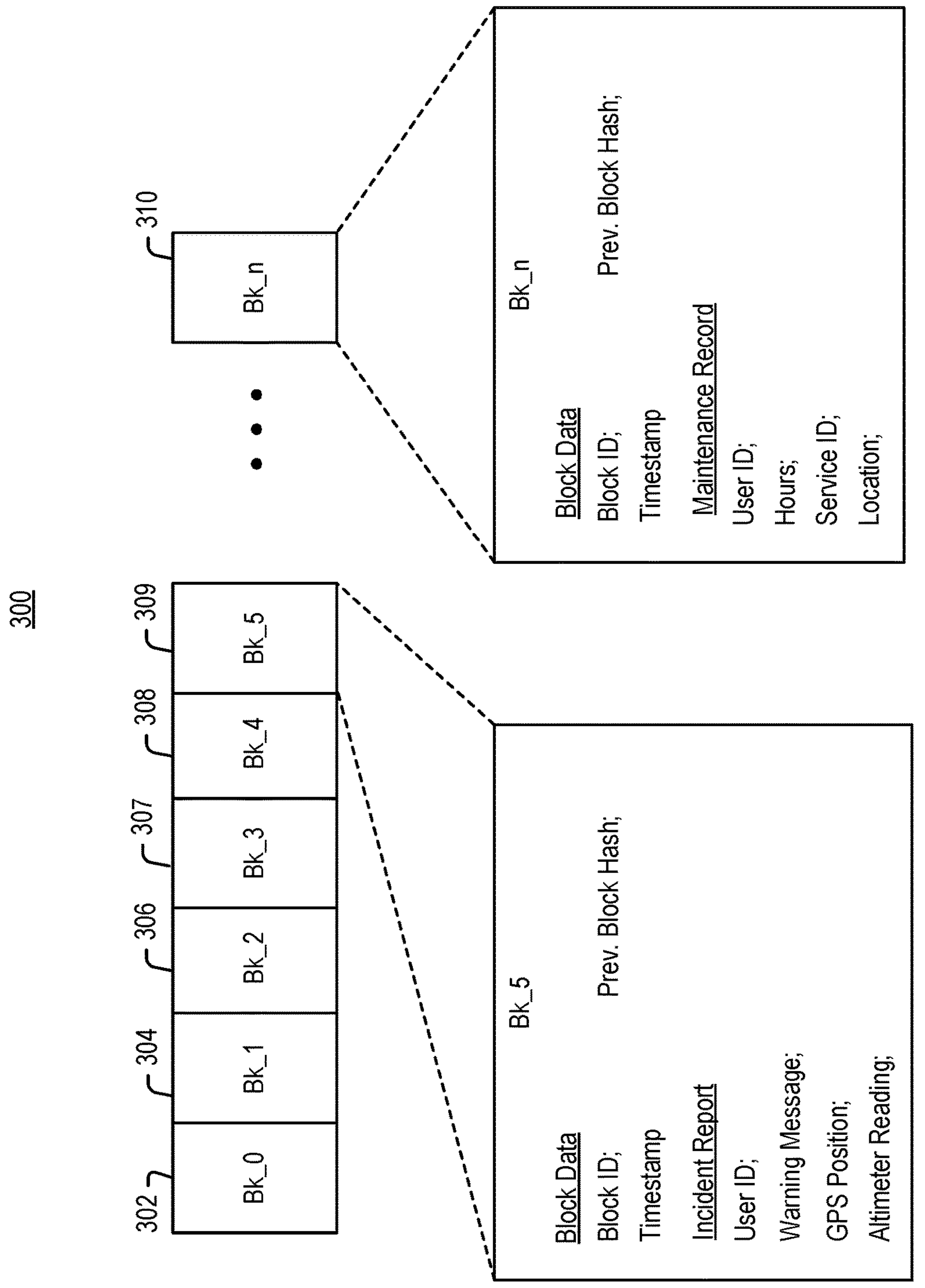
FIG. 3C is an additional view of the blockchain of FIG. 3A.

The blockchain data structure 156 may include, among other things, route information associated with the UAV 102, the telemetry data 107, the control instructions 131, and the route instructions 148. For example, the route information 110 may be used to generate blocks of the blockchain data structure 156. A sample blockchain data structure 300 is illustrated in FIGS. 3A-3C. Each block of the blockchain data structure 300 includes block data and other data, such as availability data, route data, telemetry data, service information, incident reports, etc.

The block data of each block includes information that identifies the block (e.g., a block ID) and enables the devices of the system 100) to confirm the integrity of the blockchain data structure 300. For example, the block data also includes a timestamp and a previous block hash. The timestamp indicates a time that the block was created. The block ID may include or correspond to a result of a hash function (e.g., a SHA256 hash function, a RIPEMD hash function, etc.) based on the other information (e.g., the availability data or the route data) in the block and the previous block hash (e.g., the block ID of the previous block). For example, in FIG. 3A, the blockchain data structure 300 includes an initial block (Bk_0) 302 and several subsequent blocks, including a block Bk_1 304, a block Bk_2 306, a block BK_3 307, a block BK_4 308, a block BK_5 309, and a block Bk_n 310. The initial block Bk_0 302 includes an initial set of availability data or route data, a timestamp, and a hash value (e.g., a block ID) based on the initial set of availability data or route data. As shown in FIG. 1, the block Bk_1 304 also may include a hash value based on the other data of the block Bk_1 304 and the previous hash value from the initial block Bk_0 302. Similarly, the block Bk_2 306 other data and a hash value based on the other data of the block Bk_2 306 and the previous hash value from the block Bk_1 304. The block Bk_n 310 includes other data and a hash value based on the other data of the block Bk_n 310 and the hash value from the immediately prior block (e.g., a block Bk_n−1). This chained arrangement of hash values enables each block to be validated with respect to the entire blockchain; thus, tampering with or modifying values in any block of the blockchain is evident by calculating and verifying the hash value of the final block in the block chain. Accordingly, the blockchain acts as a tamper-evident public ledger of availability data and route data for the system 100.

In addition to the block data, each block of the blockchain data structure 300 includes some information associated with a UAV (e.g., availability data, route information, telemetry data, incident reports, updated route information, maintenance records, etc.). For example, the block Bk_1 304 includes availability data that includes a user ID (e.g., an identifier of the mobile device, or the pilot, that generated the availability data), a zone (e.g., a zone at which the pilot will be available), and an availability time (e.g., a time period the pilot is available at the zone to pilot a UAV). As another example, the block Bk_2 306 includes route information that includes a UAV ID, a start point, an end point, waypoints, GPS coordinates, zone markings, time periods, primary pilot assignments, and backup pilot assignments for each zone associated with the route.

In the example of FIG. 3B, the block BK_3 307 includes telemetry data, such as a user ID (e.g., an identifier of the UAV that generated the telemetry data), a battery level of the UAV; a GPS position of the UAV; and an altimeter reading. As explained in FIG. 1, a UAV may include many types of information within the telemetry data that is transmitted to the blockchain managers of the computers within the distributed computing network 151. In a particular embodiment, the UAV is configured to periodically broadcast to the network 118, a transaction message that includes the UAV's current telemetry data. The blockchain managers of the distributed computing network receive the transaction message containing the telemetry data and store the telemetry data within the blockchain 156.

FIG. 3B also depicts the block BK_4 308 as including updated route information having a start point, an endpoint, and a plurality of zone times and backups, along with a UAV ID. In a particular embodiment, the control device 120 or the server 140 may determine that the route of the UAV should be changed. For example, the control device or the server may detect that the route of the UAV conflicts with a route of another UAV or a developing weather pattern. As another example, the control device or the server many determine that the priority level or concerns of the user have changed and thus the route needs to be changed. In such instances, the control device or the server may transmit to the UAV, updated route information, control data, or navigation information. Transmitting the updated route information, control data, or navigation information to the UAV may include broadcasting a transaction message that includes the updated route information, control data, or navigation information to the network 118. The blockchain manager 155 in the distributed computing network 151, retrieves the transaction message from the network 118 and stores the information within the transaction message in the blockchain 156.

FIG. 3C depicts the block BK_5 309 as including data describing an incident report. In the example of FIG. 3C, the incident report includes a user ID; a warning message; a GPS position; and an altimeter reading. In a particular embodiment, a UAV may transmit a transaction message that includes an incident report in response to the UAV experiencing an incident. For example, if during a flight mission, one of the UAV's propellers failed, a warning message describing the problem may be generated and transmitted as a transaction message.

FIG. 3C also depicts the block BK_n 310 that includes a maintenance record having a user ID of the service provider that serviced the UAV; flight hours that the UAV had flown when the service was performed; the service ID that indicates the type of service that was performed; and the location that the service was performed. UAV must be serviced periodically. When the UAV is serviced, the service provider may broadcast to the blockchain managers in the distributed computing network, a transaction message that includes service information, such as a maintenance record. Blockchain managers may receive the messages that include the maintenance record and store the information in the blockchain data structure. By storing the maintenance record in the blockchain data structure, a digital and immutable record or logbook of the UAV may be created. This type of record or logbook may be particularly useful to a regulatory agency and an owner/operator of the UAV.

Referring back to FIG. 1, in a particular embodiment, the server 140 includes software that is configured to receive telemetry information from an airborne UAV and track the UAV's progress and status. The server 140 is also configured to transmit in-flight commands to the UAV. Operation of the control device and the server may be carried out by some combination of a human operator and autonomous software (e.g., artificial intelligence (AI) software that is able to perform some or all of the operational functions of a typical human operator pilot).

In a particular embodiment, the route instructions 148 cause the server 140 to plan a flight path, generate route information, dynamically reroute the flight path and update the route information based on data aggregated from a plurality of data servers. For example, the server 140 may receive air traffic data 167 over the network 119 from the air traffic data server 160, weather data 177 from the weather data server 170, regulatory data 187 from the regulatory data server 180, and topographical data 197 from the topographic data server 190. It will be recognized by those of skill in the art that other data servers useful in-flight path planning of a UAV may also provide data to the server 140 over the network 101 or through direct communication with the server 140.

The air traffic data server 160 may include a processor 162, memory 164, and communication circuitry 168. The memory 164 of the air traffic data server 160 may include operating instructions 166 that when executed by the processor 162 cause the processor to provide the air traffic data 167 about the flight paths of other aircraft in a region, including those of other UAVs. The air traffic data may also include real-time radar data indicating the positions of other aircraft, including other UAVs, in the immediate vicinity or in the flight path of a particular UAV. Air traffic data servers may be, for example, radar stations, airport air traffic control systems, the FAA, UAV control systems, and so on.

The weather data server 170 may include a processor 172, memory 174, and communication circuitry 178. The memory 174 of the weather data server 170 may include operating instructions 176 that when executed by the processor 172 cause the processor to provide the weather data 177 that indicates information about atmospheric conditions along the UAV's flight path, such as temperature, wind, precipitation, lightening, humidity, atmospheric pressure, and so on. Weather data servers may be, for example, the National Weather Service (NWS), the National Oceanic and Atmospheric Administration (NOAA), local meteorologists, radar stations, other aircraft, and so on.

The regulatory data server 180 may include a processor 182, memory 184, and communication circuitry 188. The memory 184 of the regulatory data server 180 may include operating instructions 186 that when executed by the processor 182 cause the processor to provide the regulatory data 187 that indicates information about laws and regulations governing a particular region of airspace, such as airspace restrictions, municipal and state laws and regulations, permanent and temporary no-fly zones, and so on. Regulatory data servers may include, for example, the FAA, state and local governments, the Department of Defense, and so on.

The topographical data server 190 may include a processor 192, memory 194, and communication circuitry 198. The memory 194 of the topographical data server 190 may include operating instructions 196 that when executed by the processor 192 cause the processor to provide the topographical data that indicates information about terrain, places, structures, transportation, boundaries, hydrography, orthoimagery, land cover, elevation, and so on. Topographic data may be embodied in, for example, digital elevation model data, digital line graphs, and digital raster graphics. Topographic data servers may include, for example, the United States Geological Survey or other geographic information systems (GISs).

In some embodiments, the server 140 may aggregate data from the data servers 160, 170, 180, 190 using application program interfaces (APIs), syndicated feeds and eXtensible Markup Language (XML), natural language processing, JavaScript Object Notation (JSON) servers, or combinations thereof. Updated data may be pushed to the server 140 or may be pulled on-demand by the server 140. Notably, the FAA may be an important data server for both airspace data concerning flight paths and congestion as well as an important data server for regulatory data such as permanent and temporary airspace restrictions. For example, the FAA provides the Aeronautical Data Delivery Service (ADDS), the Aeronautical Product Release API (APRA), System Wide Information Management (SWIM), Special Use Airspace information, and Temporary Flight Restrictions (TFR) information, among other data. The National Weather Service (NWS) API allows access to forecasts, alerts, and observations, along with other weather data. The USGS Seamless Server provides geospatial data layers regarding places, structures, transportation, boundaries, hydrography, orthoimagery, land cover, and elevation. Readers of skill in the art will appreciate that various governmental and non-governmental entities may act as data servers and provide access to that data using APIs, JSON, XML, and other data formats.

Readers of skill in the art will realize that the server 140 can communicate with a UAV 102 using a variety of methods. For example, the UAV 102 may transmit and receive data using Cellular, 5G, Sub 1 GHz, SigFox, WiFi networks, or any other communication means that would occur to one of skill in the art.

The network 119 may comprise one or more Local Area Networks (LANs), Wide Area Networks (WANs), cellular networks, satellite networks, internets, intranets, or other networks and combinations thereof. The network 119 may comprise one or more wired connections, wireless connections, or combinations thereof.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), and others as will occur to those of skill in the art. Various embodiments of the present invention may be implemented on a variety of hardware platforms in addition to those illustrated in FIG. 1.

Figure 2:
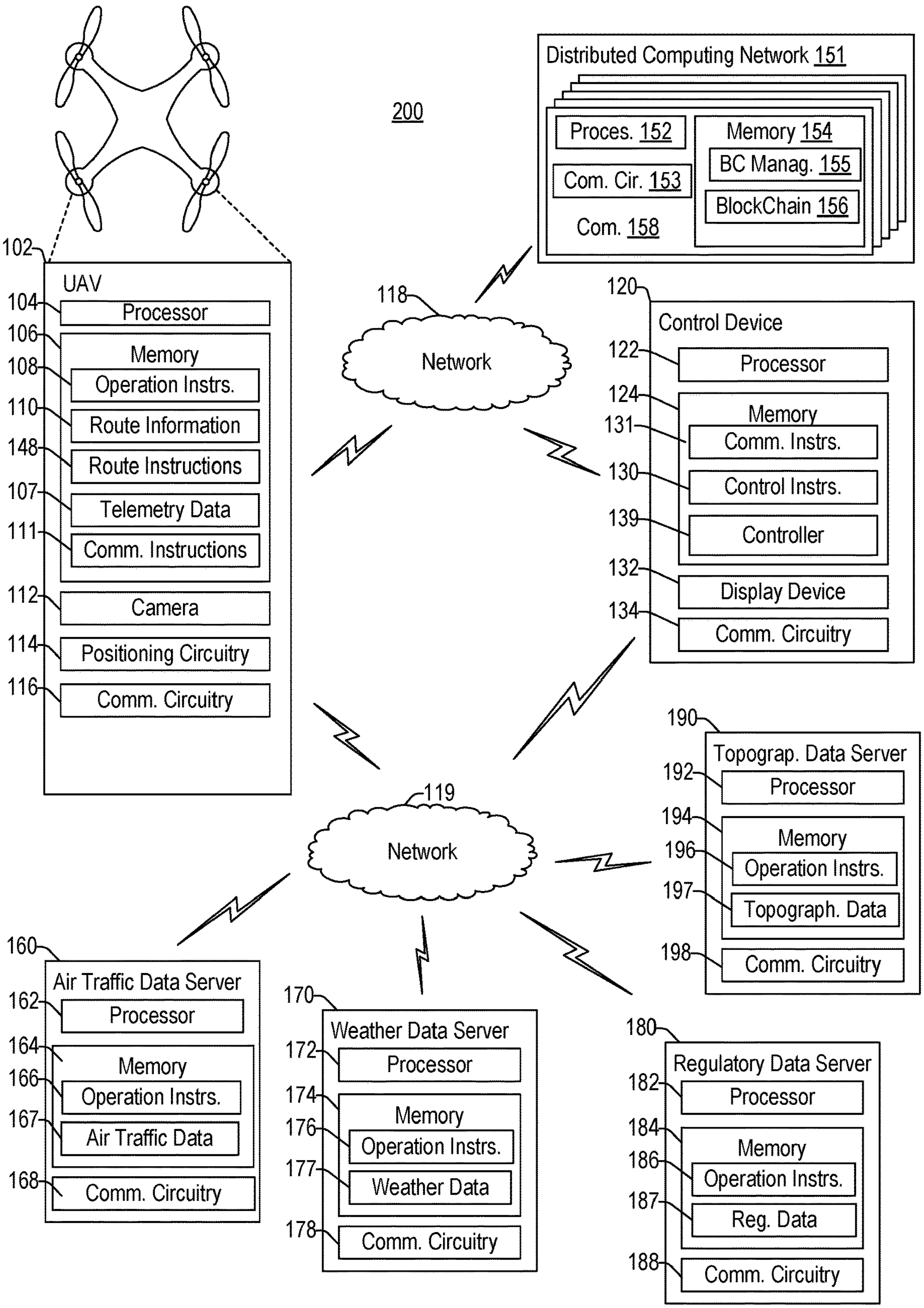
FIG. 2 is a block diagram illustrating another implementation of a system for automated preflight evaluation of an unmanned aerial vehicle configuration, according to at least one embodiment of the present invention.

For further explanation, FIG. 2 sets forth a block diagram illustrating another implementation of a system 200 for operating a UAV. Specifically, the system 200 of FIG. 2 shows an alternative configuration in which one or both of the UAV 102 and the server 140 may include route instructions 148 for generating route information. In this example, instead of relying on a server 140 to generate the route information, the UAV 102 and the control device 120 may retrieve and aggregate the information from the various data sources (e.g., the air traffic data server 160, the weather data server 170, the regulatory data server 180, and the topographical data server 190). As explained in FIG. 1, the route instructions may be configured to use the aggregated information from the various source to plan and select a flight path for the UAV 102.

A UAV, such as the UAV 102 of FIGS. 1 and 2, may be used to perform mission modes. A mission mode, as set forth herein, is defined as an intended purpose for which the UAV is being flown. In some examples, a mission mode may be strictly controlled, so that the UAV flies a particular, controlled route. For example, a waypoint mission mode follows a set of waypoints. In another example, a mission mode may include surveillance in which the UAV flies a particular pattern to observe a location. In another example, a mission mode may be loosely defined with a start time, stop time, and/or general location. For example, a mission mode may be free flight mission mode, in which there is no pattern to follow. Instead, an operator may fly the UAV during free flight using remote controls. In some examples, the mission mode may lie in between strictly controlled and loosely defined. For example, a mission mode may be a waypoint mission mode, in which the UAV should pass defined waypoints, but may be free to plot its course between the waypoints.

Figure 4:
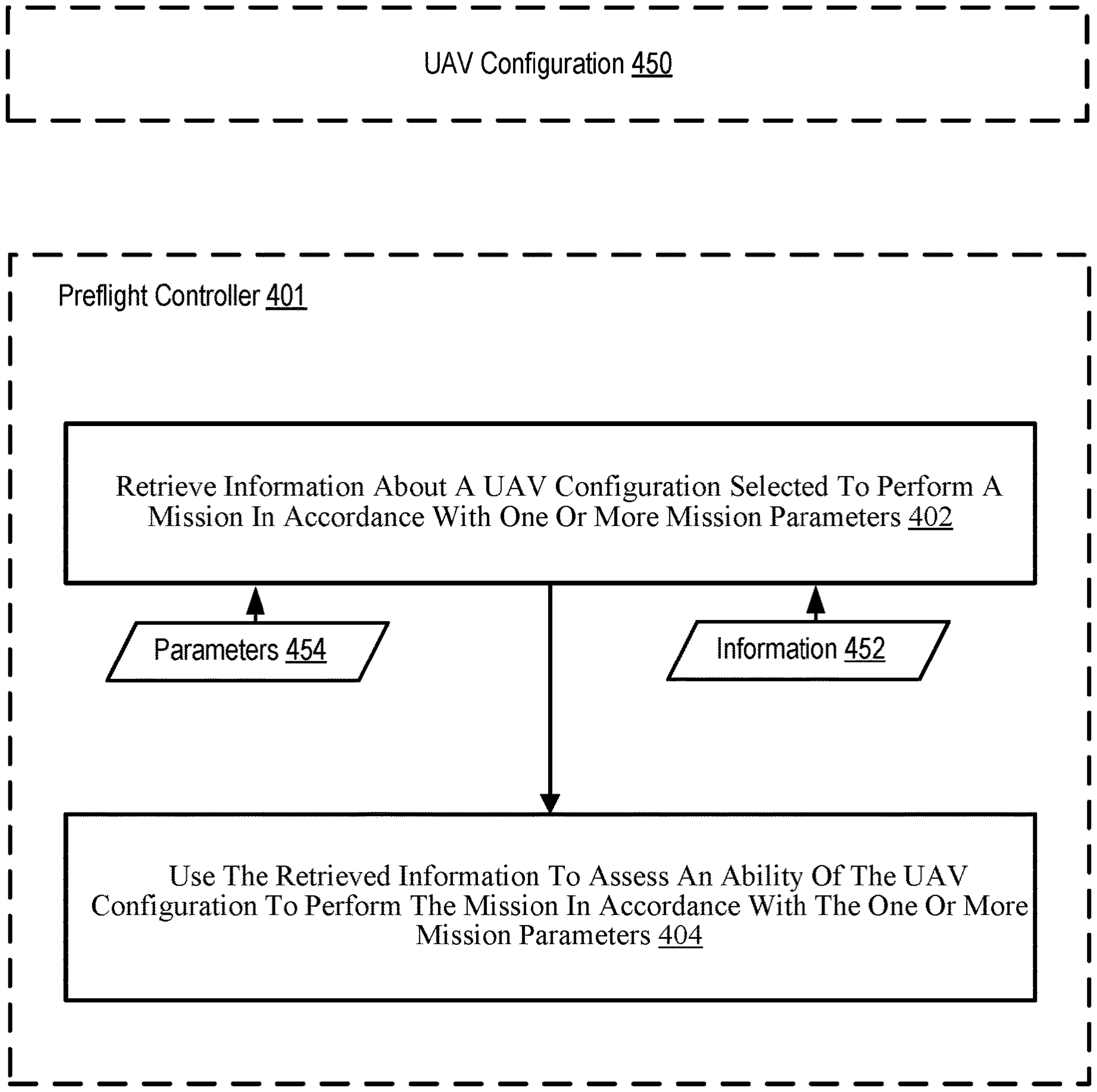
FIG. 4 is a flowchart to illustrate an implementation of a method for automated preflight evaluation of an unmanned aerial vehicle configuration, according to at least one embodiment of the present invention.

For further explanation, FIG. 4 sets forth a flow chart illustrating an exemplary method for automated preflight evaluation of an UAV configuration in accordance with at least one embodiment of the present disclosure. The method of FIG. 4 includes retrieving 402, by a preflight controller 401, information 452 about a UAV configuration 450 selected to perform a mission in accordance with one or more mission parameters 454. The preflight controller 401 of FIG. 4 may be the preflight controller 139 of FIGS. 1 and 2 and the preflight controller 145 of FIG. 1.

A UAV configuration is a configuration, set, or collection of one or more UAVs. In a particular embodiment, the one or more UAVs of the UAV configuration may be particular UAVs. For example, a UAV configuration may include a particular UAV that is in a UAV's fleet of UAVs. Alternatively, the UAV configuration may not be any one particular UAV and instead may be unspecified or generic UAVs having particular specifications. For example, a UAV configuration may include a generic UAV having particular specifications, such as a particular rating, a particular maximum range, a particular maximum speed, a particular cargo capacity, a particular UAV type, and a particular availability. In this example, the generic UAVs of this UAV configuration may be fulfilled or implemented by any particular UAV matching the particular specifications of the UAV configuration. Information about a UAV configuration may include any data indicating information associated with the UAV configuration, such as details regarding any specifications of the UAV configuration. Examples of information about a UAV configuration include but are not limited to information identifying the particular UAVs of the UAV configuration; and information indicating the specifications of any generic UAVs.

A mission is a flight operation carried out by one or more UAVs and defined by one or more mission parameters. Mission parameters may be any form of data, value, condition, or rule that can be used to explain, limit, or define some aspect of a mission. Examples of mission parameters include but are not limited to time and date constraints for starting, finishing, or completing the mission; size of a payload or package to be delivered; type of hardware to be included on the UAV; type of software to be included on the UAV; type of mission to be performed (e.g., surveillance mission, free flight mission, search mission, etc.); UAV rating (e.g., the user may require a UAV having a particular weather rating, a particular payload rating, a particular distance rating, a particular max flying height rating, a type of payload rating, and a mission type rating); and pilot rating (e.g., the user may require a pilot of a particular experience level (type of mission experience, total flying hours completed by the pilot, type of UAV experience) to fly the mission). For example, the user may input into a GUI a request for a mission to deliver a payload of a particular size from location 1 to location 2 on a particular day by a particular time, by a pilot with particular credentials, using a UAV that is capable of carrying loads up to a certain amount.

Retrieving 402, by a preflight controller 401, information 452 about a UAV configuration 450 selected to perform a mission in accordance with one or more mission parameters 454 may be carried out by accessing or receiving information stored in some portion, component, or device of the system. In a particular embodiment, information about the UAV configuration may be stored in memory or storage accessible by the preflight controller 401.

In addition, the method of FIG. 4 also includes using 404, by the preflight controller 401, the retrieved information 452 to assess an ability of the UAV configuration 450 to perform the mission in accordance with the one or more mission parameters 454. As explained above, the mission parameters specify and define what must be accomplished by the UAV configuration to perform the mission. The preflight controller uses the information about the UAV configuration to determine the ability of the particular UAV configuration to perform the mission in accordance with the one or more mission parameters. Using 404, by the preflight controller 401, the retrieved information 452 to assess an ability of the UAV configuration 450 to perform the mission in accordance with the one or more mission parameters 454 may be carried out by identifying a specification in the information and comparing the identified specification with an associated mission parameter; identifying a specification of a particular UAV listed in the information and comparing the identified specification with an associated mission parameters; and determining whether the identified specification satisfies the mission parameter.

In a particular embodiment, the preflight controller may include an index that associates particular categories of information about the UAV configuration with particular mission parameters. For example, the information about the UAV configuration may specify a range of the UAV configuration. In this example, the association index may specify that information about the range of the UAV configuration is associated with a mission parameter that specifies a range requirement for the mission.

For example, the information about the UAV configuration may specify that the UAV configuration includes a UAV that has a range of 10 miles. Continuing with this example, the mission parameters may require a range of 20 miles. In this example, the preflight controller may determine that the UAV configuration does not have the ability to perform the mission in accordance with the one or more mission parameters. As another example, the information about the UAV configuration may specify that the UAV configuration includes a UAV with a cargo capacity of 3 pounds, but the mission parameters require transport of a 5-pound cargo. In this example, the preflight controller may determine that the UAV configuration does not have the ability to perform the mission in accordance with the one or more mission parameters.

In a particular embodiment, using 404, by the preflight controller 401, the retrieved information 452 to assess an ability of the UAV configuration 450 to perform the mission in accordance with the one or more mission parameters 454 may be carried out by determining for UAV configurations having similar specifications a historical success rate of performing missions with similar mission parameters; determining, based on the historical success rate, an assessment of the ability of the UAV configuration to perform the mission.

For example, the information about the UAV configuration may specify that the UAV has a range of 10 miles and the mission parameters may require a range of 8 miles over a particular area. In this example, the preflight controller may determine that historically UAVs with specified ranges of 10 miles have only an 80% success rate of completing missions that require a range of 8 miles over the particular area. Continuing with this example, the preflight controller may assess the ability of the UAV configuration at 80%.

Figure 5:
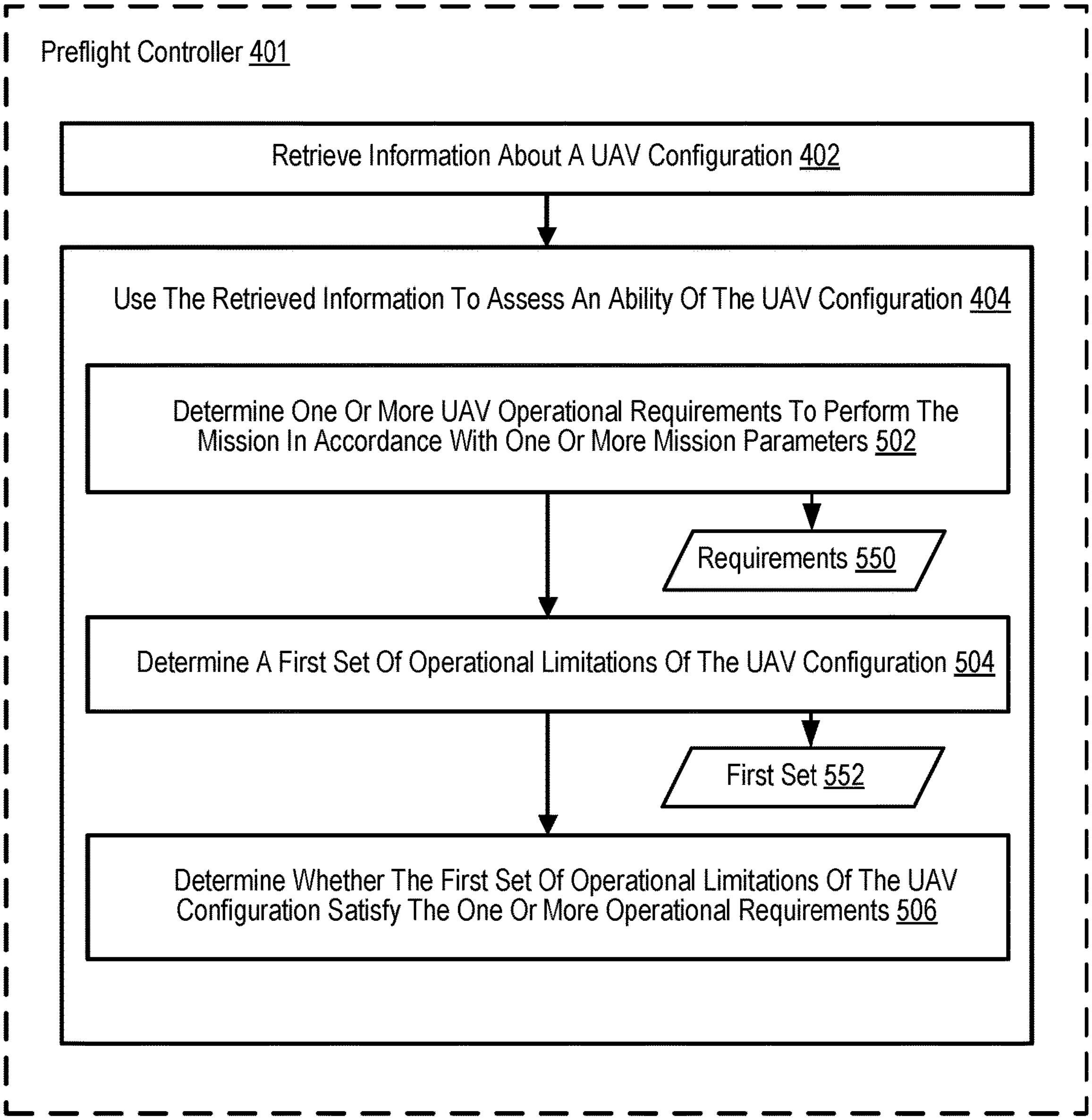
FIG. 5 is a flowchart to illustrate an implementation of a method for automated preflight evaluation of an unmanned aerial vehicle configuration, according to at least one embodiment of the present invention.

For further explanation, FIG. 5 sets forth a flow chart illustrating an exemplary method for automated preflight evaluation of an UAV configuration in accordance with at least one embodiment of the present disclosure. The method of FIG. 5 is similar to the method of FIG. 4 in that the method of FIG. 5 also includes retrieving 402, by a preflight controller 401, information 452 about a UAV configuration 450 selected to perform a mission in accordance with one or more mission parameters 454; and using 404, by the preflight controller 401, the retrieved information 452 to assess an ability of the UAV configuration 450 to perform the mission in accordance with the one or more mission parameters 454.

In the method of FIG. 5, using 404, by the preflight controller 401, the retrieved information 452 to assess an ability of the UAV configuration 450 to perform the mission in accordance with the one or more mission parameters 454 includes determining 502 one or more UAV operational requirements 550 to perform the mission in accordance with one or more mission parameters 454. A UAV operational requirement is a requirement for a UAV to perform a particular operation. Examples of UAV operational requirements include but are not limited to airborne time, mission range, cargo capacity, maximum speed, and others as will occur to those of skill in the art. Determining 502 one or more UAV operational requirements 550 to perform the mission in accordance with one or more mission parameters 454 may be carried out by examining the one or more mission parameters and determining a UAV operational requirement to satisfy the one or more mission parameters. For example, a particular mission parameter may specify a cargo of 5-pounds. In this example, the preflight controller may determine that the associated UAV operational requirement is a UAV cargo capacity of 5 or more pounds.

According to the method of FIG. 5, using 404, by the preflight controller 401, the retrieved information 452 to assess an ability of the UAV configuration 450 to perform the mission in accordance with the one or more mission parameters 454 includes determining 504 a first set 552 of operational limitations of the UAV configuration 450. An operational limitation of a UAV configuration is a limitation of some operational aspect of one or more UAVs in the UAV configuration. Examples of operational limitations include but are not limited to cargo capacity; maximum airborne time; average speed; cruising speed; maximum range; battery capacity; rating; and other as will occur to those of skill in the art.

Determining 504 a first set 552 of operational limitations of the UAV configuration 450 may be carried out by identifying within the retrieved information about the UAV configuration, a specification of one or more generic UAVs; identifying a specification of one or more particular UAVs identified in the retrieved information about the UAV configuration; and using the specification to determine the operational limitations of the UAV configuration. For example, a particular UAV in the UAV configuration may have a specification indicating a 5-pound cargo capacity and a maximum range of 10 miles. In this example, the preflight controller may determine that the first set of operational limitations of the UAV configuration may include a limitation of 5-pounds for cargo and a limit of 10 miles for range.

In the method of FIG. 5, using 404, by the preflight controller 401, the retrieved information 452 to assess an ability of the UAV configuration 450 to perform the mission in accordance with the one or more mission parameters 454 includes determining 506 whether the first set 552 of operational limitations of the UAV configuration 450 satisfy the one or more UAV operational requirements 550. Determining 506 whether the first set 552 of operational limitations of the UAV configuration 450 satisfy the one or more UAV operational requirements 550 may be carried out by comparing a UAV operational requirement with an associated operational limitation of the first set of operational limitations. For example, the preflight controller may determine a UAV operational requirement of a 4-pound cargo capacity and a UAV operational limitation of 5-pound cargo capacity. In this example, the preflight controller may determine that the UAV operational limitation satisfies the UAV operational requirement.

Figure 6:
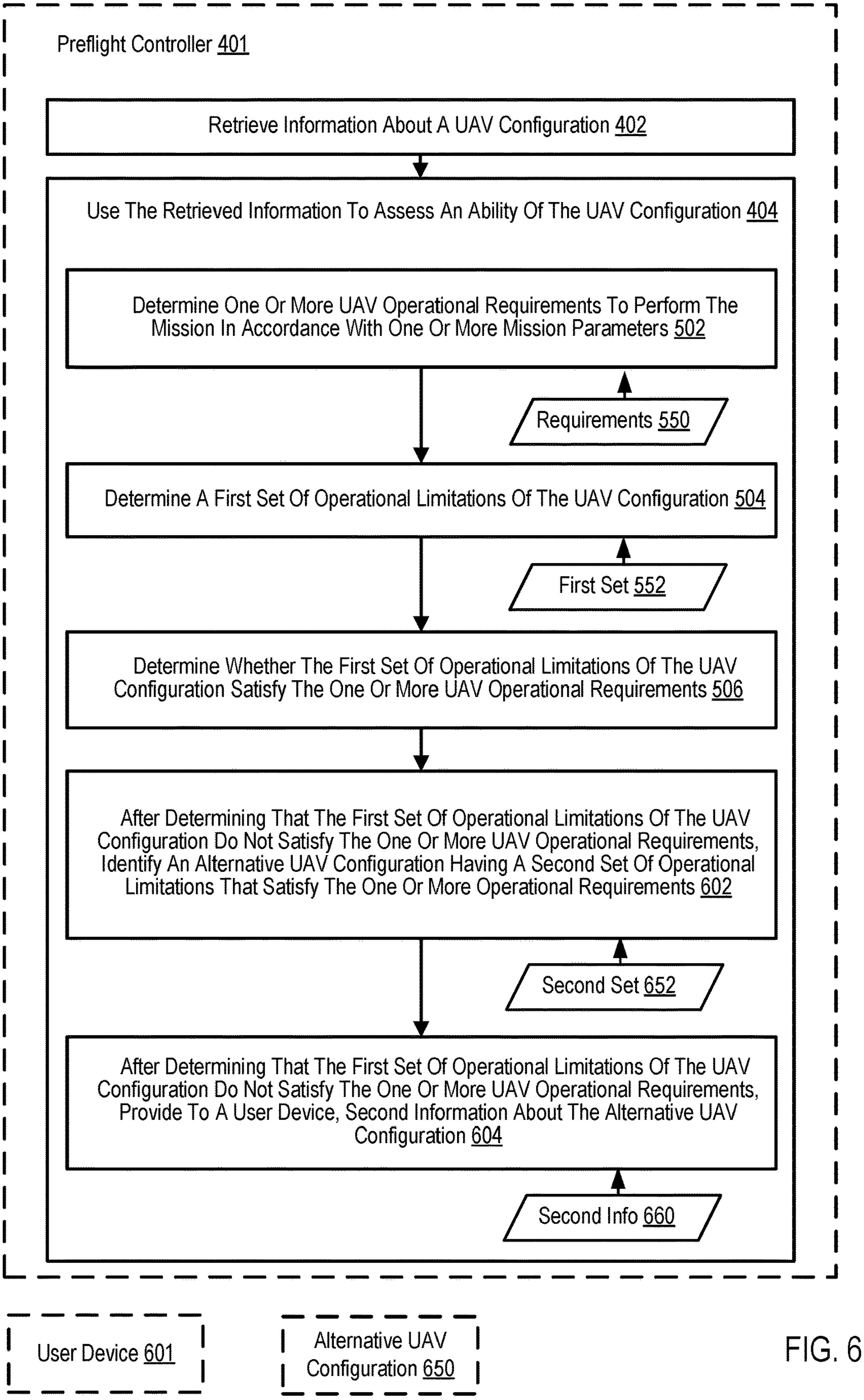
FIG. 6 is a flowchart to illustrate an implementation of a method for automated preflight evaluation of an unmanned aerial vehicle configuration, according to at least one embodiment of the present invention.

For further explanation, FIG. 6 sets forth a flow chart illustrating an exemplary method for automated preflight evaluation of an UAV configuration in accordance with at least one embodiment of the present disclosure. The method of FIG. 6 is similar to the method of FIG. 5 in that the method of FIG. 6 also includes retrieving 402, by a preflight controller 401, information 452 about a UAV configuration 450 selected to perform a mission in accordance with one or more mission parameters 454; and using 404, by the preflight controller 401, the retrieved information 452 to assess an ability of the UAV configuration 450 to perform the mission in accordance with the one or more mission parameters 454 including: determining 502 one or more UAV operational requirements 550 for one or more UAVs to perform the mission in accordance with one or more mission parameters 454; determining 504 a first set 552 of operational limitations of the UAV configuration 450; and determining 506 whether the first set 552 of operational limitations of the UAV configuration 450 satisfy the one or more UAV operational requirements 550.

However, the method of FIG. 6 includes after determining that the first set 552 of operational limitations of the UAV configuration 450 do not satisfy the one or more UAV operational requirements 550, identifying 602, by the preflight controller 401, an alternative UAV configuration 650 having a second set 652 of operational limitations that satisfy the one or more UAV operational requirements 550. An alternative UAV configuration is different in some way to the UAV configuration. The alternative UAV configuration is any configuration of UAVs that includes at least one change to the specification of generic UAVs or membership of particular UAVs in the UAV configuration. Identifying 602, by the preflight controller 401, an alternative UAV configuration 650 having a second set 652 of operational limitations that satisfy the one or more UAV operational requirements 550 may be carried out by identifying the operations limitations of the UAV configuration that do not satisfy the one or more UAV operational requirements; and identifying an alternative UAV configuration that has an operational limitation that does satisfy the one or more UAV operational requirements. For example, the preflight controller may determine that the UAV operational requirement of 5-pounds for cargo is not satisfied by the UAV configuration having a first set of operational limitations that includes an operational limitation of 4 pounds for cargo. In this example, the preflight controller may identify an alternative UAV configuration having a second set of operational limitations that includes an operational limitation of 6 pounds for cargo, which does satisfy the 5-pound cargo operational requirement for the mission.

In addition, the method of FIG. 6 also includes after determining that the first set 552 of operational limitations of the UAV configuration 450 do not satisfy the one or more UAV operational requirements 550, providing 604 to a user device 601, by the preflight controller 401, second information 660 about the alternative UAV configuration 650. Second information about the alternative UAV configuration may include any data indicating information associated with the alternative UAV configuration. Examples of information about an alternative UAV configuration include but are not limited to information identifying the particular UAVs of the alternative UAV configuration; and information indicating the specifications of any generic UAVs. Providing 604 to a user device 601, by the preflight controller 401, second information 660 about the alternative UAV configuration 650 may be carried out by sending data to a control device or user device for display to the user. For example, the control device or user device may display a recommendation to change the UAV configuration to the alternative UAV configuration.

Figure 7:
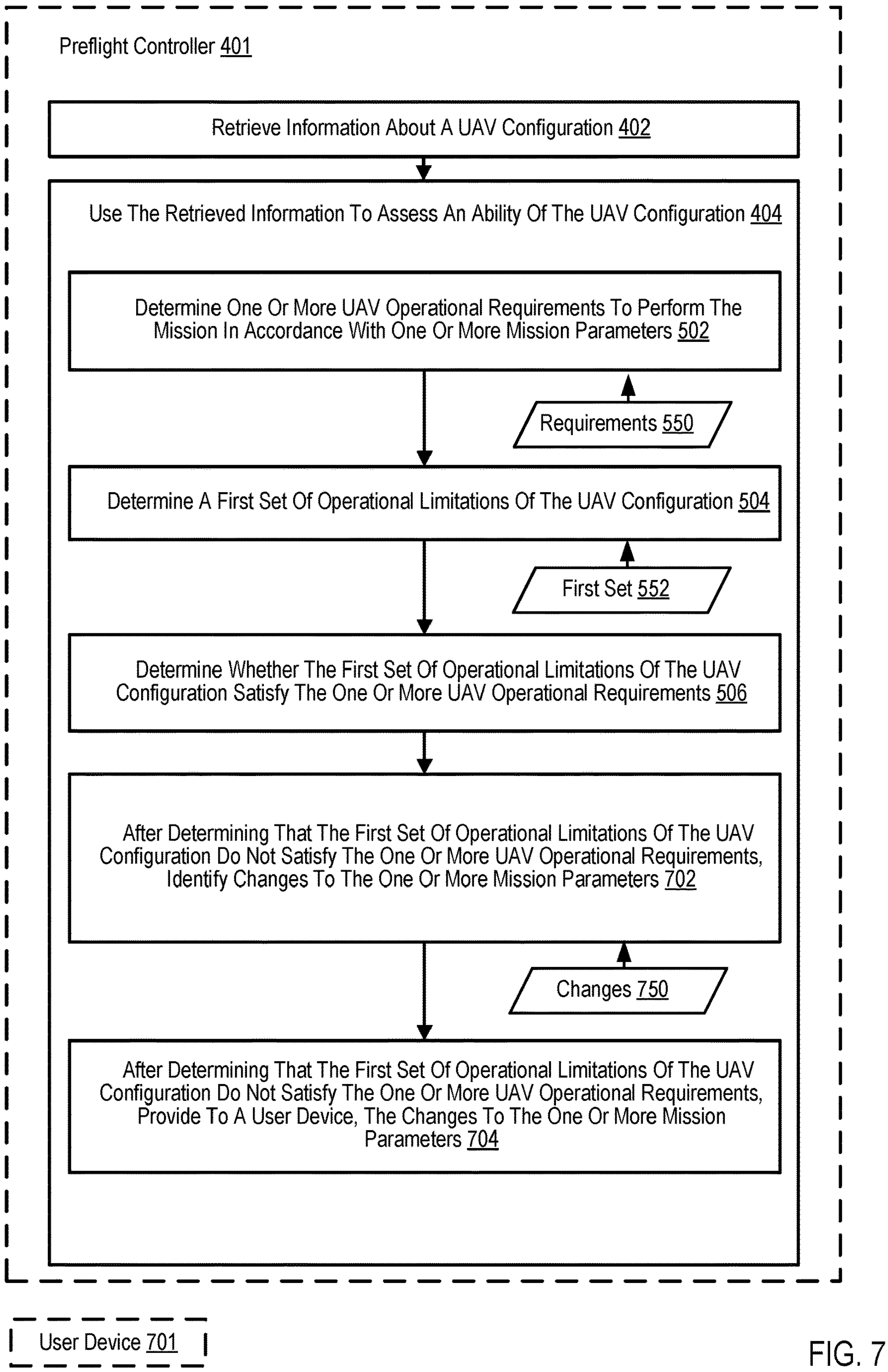
FIG. 7 is a flowchart to illustrate an implementation of a method for automated preflight evaluation of an unmanned aerial vehicle configuration, according to at least one embodiment of the present invention.

For further explanation, FIG. 7 sets forth a flow chart illustrating an exemplary method for automated preflight evaluation of an UAV configuration in accordance with at least one embodiment of the present disclosure. The method of FIG. 7 is similar to the method of FIG. 5 in that the method of FIG. 7 also includes retrieving 402, by a preflight controller 401, information 452 about a UAV configuration 450 selected to perform a mission in accordance with one or more mission parameters 454; and using 404, by the preflight controller 401, the retrieved information 452 to assess an ability of the UAV configuration 450 to perform the mission in accordance with the one or more mission parameters 454 including: determining 502 one or more UAV operational requirements 550 to perform the mission in accordance with one or more mission parameters 454; determining 504 a first set 552 of operational limitations of the UAV configuration 450; and determining 506 whether the first set 552 of operational limitations of the UAV configuration 450 satisfy the one or more UAV operational requirements 550.

However, the method of FIG. 7 includes after determining that the first set 552 of operational limitations of the UAV configuration 450 do not satisfy the one or more UAV operational requirements 550, identifying 702, by the preflight controller 401, changes 750 to the one or more mission parameters 454, the changes 750 associated with updated UAV operational requirements 752 that satisfy the first set 552 of operational limitations of the UAV configuration 450. Identifying 702, by the preflight controller 401, changes 750 to the one or more mission parameters 454, the changes 750 associated with updated UAV operational requirements 752 that satisfy the first set 552 of operational limitations of the UAV configuration 450 may be carried out by determining which UAV operational requirements are not satisfied by the first set of operational limitations; determining a new UAV operational requirement that is satisfied by the first set of operational limitations; and determining the changes to the one or more mission parameters that are associated with the new UAV operational requirement. For example, the preflight controller may determine that the UAV operational requirement of a 5-pound cargo capacity is not satisfied by the first set of operational limitations that include an operational limitation of 4 pounds of cargo. In this example, the preflight controller may determine that a change to the mission parameters, which specifies a cargo of 4 pounds is associated with a UAV operational requirement of a 4-pound cargo capacity that satisfies the first set of operational limitations of 4 pounds of cargo. That is, in response to operational limitations of the UAV configuration not satisfying the UAV operational requirements of the mission, instead of changing the UAV configuration, the preflight controller identifies changes to the mission parameters such that the selected UAV configuration has the ability to perform the mission.

In addition, the method of FIG. 7 also includes after determining that the first set 552 of operational limitations of the UAV configuration 450 do not satisfy the one or more UAV operational requirements 550, providing 704 to a user device 701, by the preflight controller 401, the changes 750 to the one or more mission parameters 454. Providing 704 to a user device 701, by the preflight controller 401, the changes 750 to the one or more mission parameters 454 may be carried out by sending data to a control device or user device for display to the user. For example, the control device or user device may display a recommendation to change the one or more mission parameters.

Figure 8:
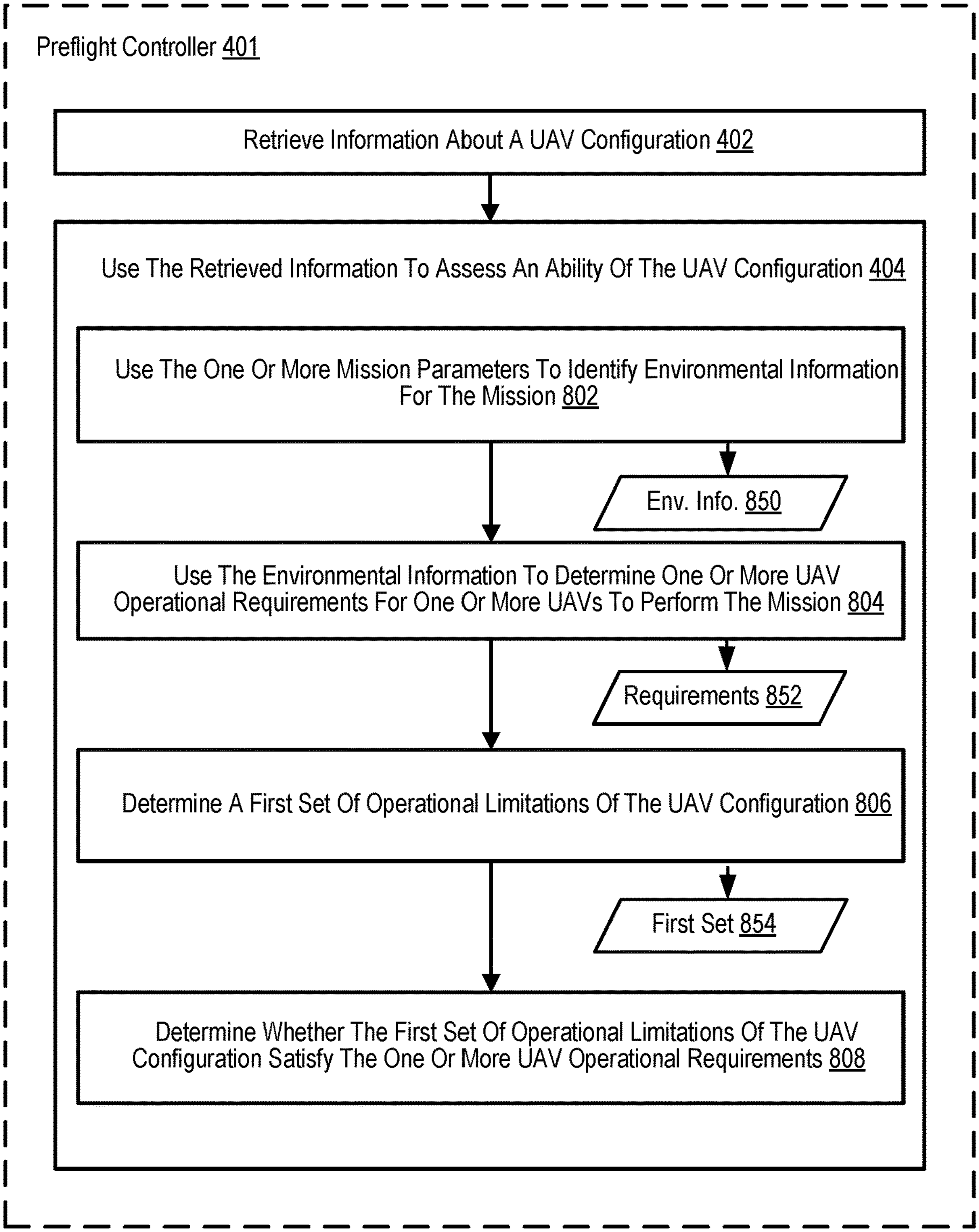
FIG. 8 is a flowchart to illustrate an implementation of a method for automated preflight evaluation of an unmanned aerial vehicle configuration, according to at least one embodiment of the present invention.

For further explanation, FIG. 8 sets forth a flow chart illustrating an exemplary method for automated preflight evaluation of an UAV configuration in accordance with at least one embodiment of the present disclosure. The method of FIG. 8 is similar to the method of FIG. 4 in that the method of FIG. 8 also includes retrieving 402, by a preflight controller 401, information 452 about a UAV configuration 450 selected to perform a mission in accordance with one or more mission parameters 454; and using 404, by the preflight controller 401, the retrieved information 452 to assess an ability of the UAV configuration 450 to perform the mission in accordance with the one or more mission parameters 454.

In the method of FIG. 8, using 404, by the preflight controller 401, the retrieved information 452 to assess an ability of the UAV configuration 450 to perform the mission in accordance with the one or more mission parameters 454 includes using 802 the one or more mission parameters 454 to identify environmental information 850 for the mission. Environmental information is any information associated with the environment the UAV configuration may experience while performing the mission. Examples of environmental information include but are not limited to weather, topography, and regulatory restrictions. Using 802 the one or more mission parameters 454 to identify environmental information 850 for the mission may be carried out by identifying a date and time for the mission; identifying an area that the mission will take place; and retrieving from data sources, environmental information associated with the identified date, time, and area. For example, for an identified time, date, and area, the preflight controller may: retrieve weather data from a weather data server (e.g., the weather data server 170 of FIG. 1); retrieve air traffic data from an air traffic data server (e.g., the air traffic data server 160 of FIG. 1); retrieve regulatory data from a regulatory data server (e.g., the regulatory data server 180 of FIG. 1); and retrieve topographical data from a topographical data server (e.g., the topographical data server 190 of FIG. 1).

According to the method of FIG. 8, using 404, by the preflight controller 401, the retrieved information 452 to assess an ability of the UAV configuration 450 also includes using 804 the environmental information 850 to determine one or more UAV operational requirements 852 to perform the mission. Using 804 the environmental information 850 to determine one or more UAV operational requirements 852 to perform the mission may be carried out by associating environmental information with a UAV operational requirement. For example, if weather data indicates the UAV configuration may encounter rain, the preflight controller may determine that one of the UAV operational requirements includes an ability to fly in rain. As another example, if regulatory data indicates that flight in the area must occur above a particular height, the preflight controller may determine that one of the UAV operational requirements includes flying above the particular height. In another example, if the air traffic data indicates the presence of highly congested areas for the mission, the preflight controller may determine that an operational requirement includes having software and hardware for collision avoidance. As another example, if the topographical data indicates lots of buildings in the area for the mission, the preflight controller may determine that an operational requirement includes having software and hardware for detecting objects. In a particular embodiment, the preflight controller may include an index that associates particular categories of environmental information with particular UAV operational requirements. In this embodiment, the preflight controller uses the index to determine which UAV operational requirements to associate with a given category of environmental information.

In the example of FIG. 8, using 404, by the preflight controller 401, the retrieved information 452 to assess an ability of the UAV configuration 450 includes determining 806 a first set 854 of operational limitations of the UAV configuration 450. Determining 806 a first set 854 of operational limitations of the UAV configuration 450 may be carried out by combining the determine operational limitations into a first set of operational limitations.

In the method of FIG. 8, using 404, by the preflight controller 401, the retrieved information 452 to assess an ability of the UAV configuration 450 also includes determining 808 whether the first set 854 of operational limitations of the UAV configuration 450 satisfy the one or more UAV operational requirements 852. Determining 808 whether the first set 854 of operational limitations of the UAV configuration 450 satisfy the one or more UAV operational requirements 852 may be carried out by comparing the operational limitations of the UAV configuration to the UAV operational requirements of the mission.

Figure 9:
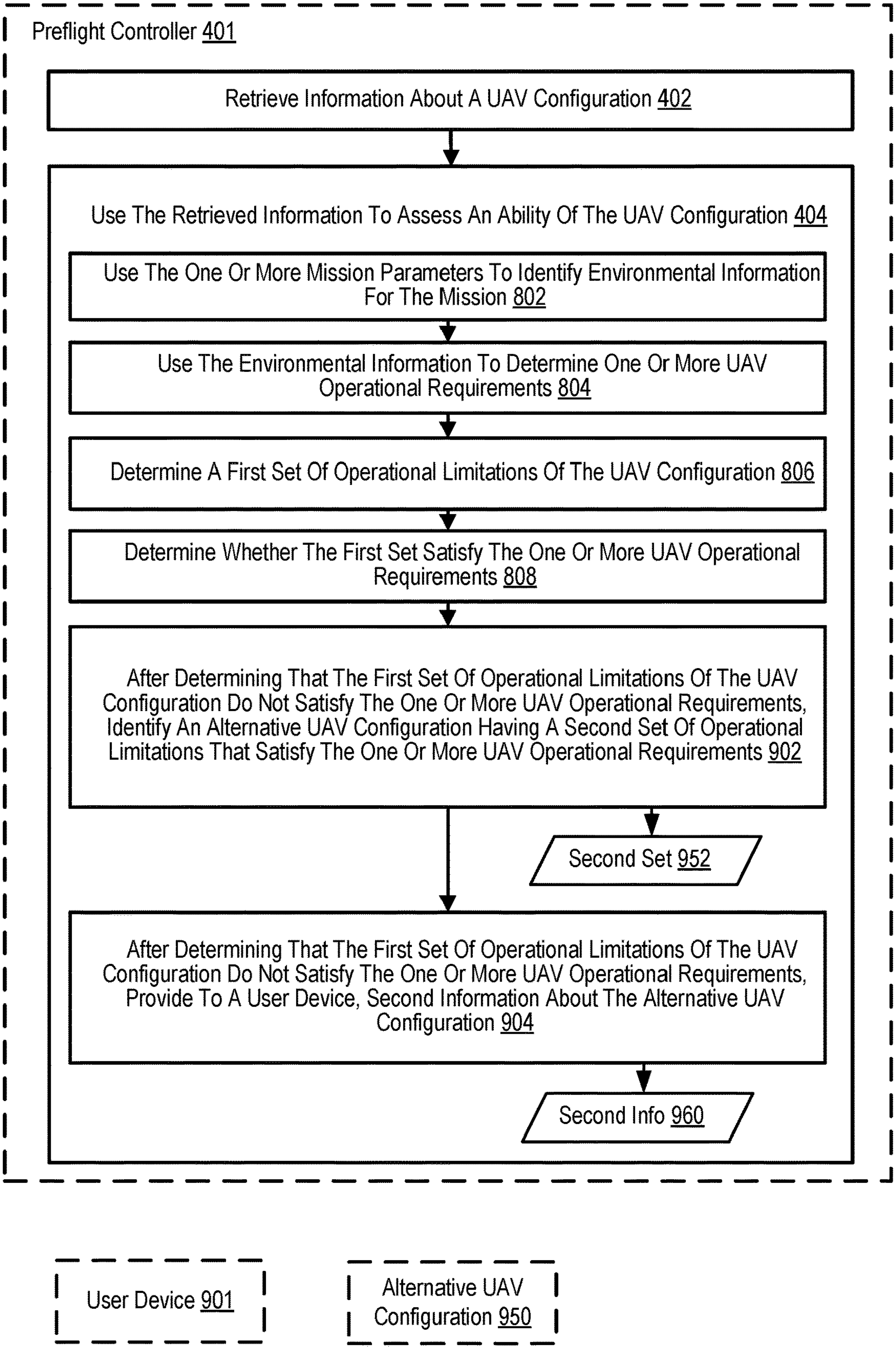
FIG. 9 is a flowchart to illustrate an implementation of a method for automated preflight evaluation of an unmanned aerial vehicle configuration, according to at least one embodiment of the present invention.

For further explanation, FIG. 9 sets forth a flow chart illustrating an exemplary method for automated preflight evaluation of an UAV configuration in accordance with at least one embodiment of the present disclosure. The method of FIG. 9 is similar to the method of FIG. 8 in that the method of FIG. 9 also includes retrieving 402, by a preflight controller 401, information 452 about a UAV configuration 450 selected to perform a mission in accordance with one or more mission parameters 454; and using 404, by the preflight controller 401, the retrieved information 452 to assess an ability of the UAV configuration 450 to perform the mission in accordance with the one or more mission parameters 454 including: using 802 the one or more mission parameters 454 to identify environmental information 850 for the mission; using 804 the environmental information 850 to determine one or more UAV operational requirements 852 to perform the mission; determining 806 a first set 854 of operational limitations of the UAV configuration 450; and determining 808 whether the first set 854 of operational limitations of the UAV configuration 450 satisfy the one or more UAV operational requirements 852.

However, the method of FIG. 9 also includes after determining that the first set 854 of operational limitations of the UAV configuration 450 do not satisfy the one or more UAV operational requirements 852, identifying 902, by the preflight controller 401, an alternative UAV configuration 950 having a second set 952 of operational limitations that satisfy the one or more UAV operational requirements 852. An alternative UAV configuration is different in some way to the UAV configuration. The alternative UAV configuration is any configuration of UAVs that includes at least one change to the specification of generic UAVs or membership of particular UAVs in the UAV configuration. Identifying 902, by the preflight controller 401, an alternative UAV configuration 950 having a second set 952 of operational limitations that satisfy the one or more UAV operational requirements 852 may be carried out by identifying the operations limitations of the UAV configuration that do not satisfy the one or more UAV operational requirements; and identifying an alternative UAV configuration that has an operational limitation that does satisfy the one or more UAV operational requirements. For example, the preflight controller may determine that the UAV operational requirement of flying through wind speed of 10 mph is not satisfied by the UAV configuration having a first set of operational limitations that includes an operational limitation of flying through a maximum wind speed of 6-mph. In this example, the preflight controller may identify an alternative UAV configuration having a second set of operational limitations that includes an operational limitation of flying through 11-mph wind speed, which does satisfy the 10-mph wind speed UAV operational requirement for the mission.

In addition, the method of FIG. 9 also includes after determining that the first set 854 of operational limitations of the UAV configuration 450 do not satisfy the one or more UAV operational requirements 852, providing 904 to a user device 901, by the preflight controller 401, second information 960 the alternative UAV configuration 950. Providing 904 to a user device 901, by the preflight controller 401, the second information 960 alternative UAV configuration 950 may be carried out by sending data to a control device or user device for display to the user. For example, the control device or user device may display a recommendation to change the UAV configuration to the alternative UAV configuration.

Figure 10:
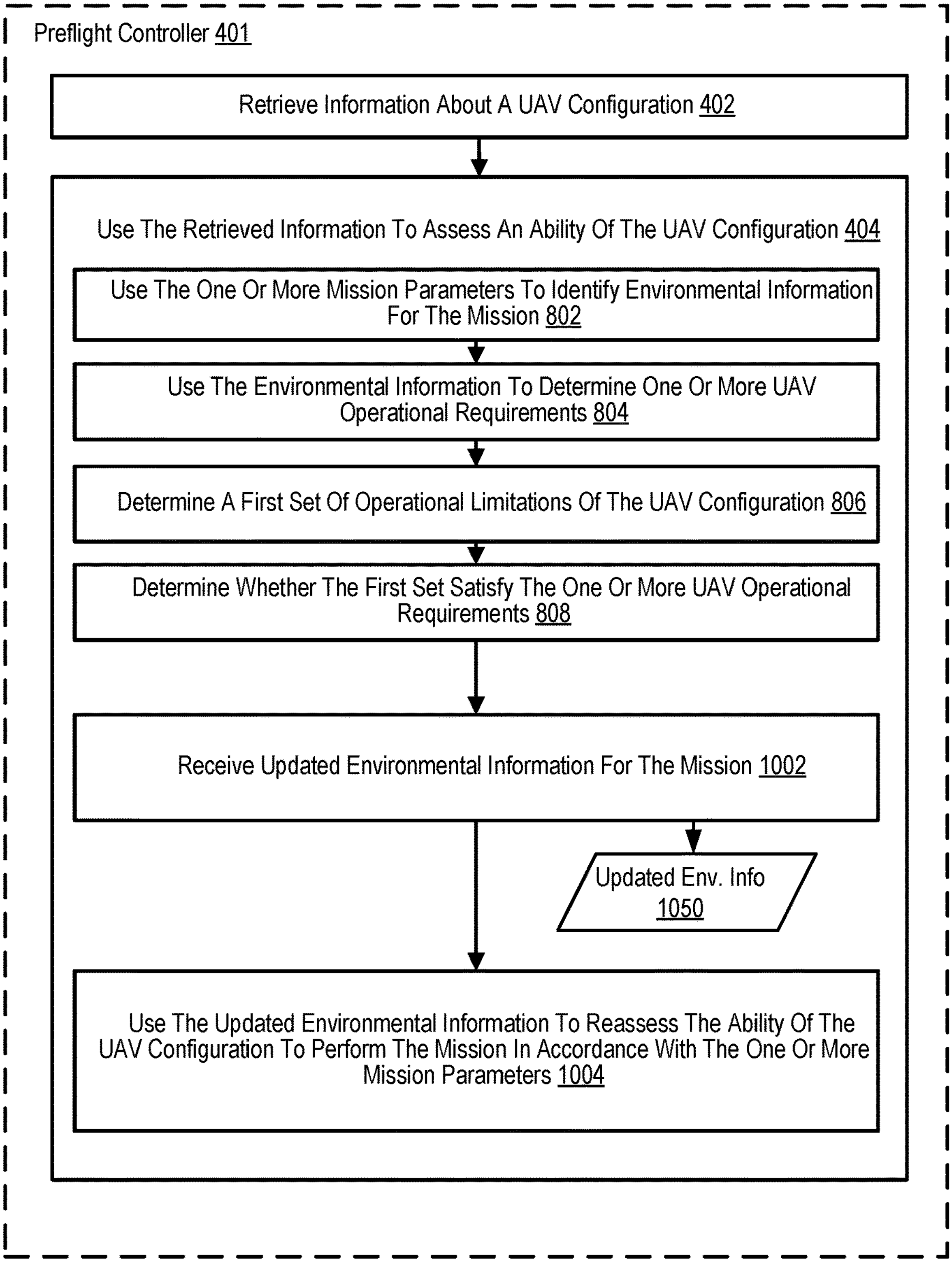
FIG. 10 is a flowchart to illustrate an implementation of a method for automated preflight evaluation of an unmanned aerial vehicle configuration, according to at least one embodiment of the present invention.

For further explanation, FIG. 10 sets forth a flow chart illustrating an exemplary method for automated preflight evaluation of an UAV configuration in accordance with at least one embodiment of the present disclosure. The method of FIG. 10 is similar to the method of FIG. 8 in that the method of FIG. 10 also includes retrieving 402, by a preflight controller 401, information 452 about a UAV configuration 450 selected to perform a mission in accordance with one or more mission parameters 454; and using 404, by the preflight controller 401, the retrieved information 452 to assess an ability of the UAV configuration 450 to perform the mission in accordance with the one or more mission parameters 454 including: using 802 the one or more mission parameters 454 to identify environmental information 850 for the mission; using 804 the environmental information 850 to determine one or more UAV operational requirements 852 for one or more UAVs to perform the mission; determining 806 a first set 854 of operational limitations of the UAV configuration 450; and determining 808 whether the first set 854 of operational limitations of the UAV configuration 450 satisfy the one or more UAV operational requirements 852.

However, the method of FIG. 10 also includes receiving 1002, by the preflight controller 401, updated environmental information 1050 for the mission. Receiving 1002, by the preflight controller 401, updated environmental information 1050 for the mission may be carried out by periodically accessing updated environmental information, such as weather data, air traffic data, regulatory data, and topographical data.

In addition, the method of FIG. 10 also includes using 1004, by the preflight controller 401, the updated environmental information 1050 to reassess the ability of the UAV configuration 450 to perform the mission in accordance with the one or more mission parameters 454. Using 1004, by the preflight controller 401, the updated environmental information 1050 to reassess the ability of the UAV configuration 450 to perform the mission in accordance with the one or more mission parameters 454 may be carried out by associating the updated environmental information with a UAV operational requirement. For example, the preflight controller may determine that the initial weather data indicated an expected wind speed of 3 mph, but the updated weather data indicates an expected wind speed of 10 mph. In this example, the preflight controller may determine the UAV operational requirement includes flying through a wind speed of 10 mph.

Figure 11:
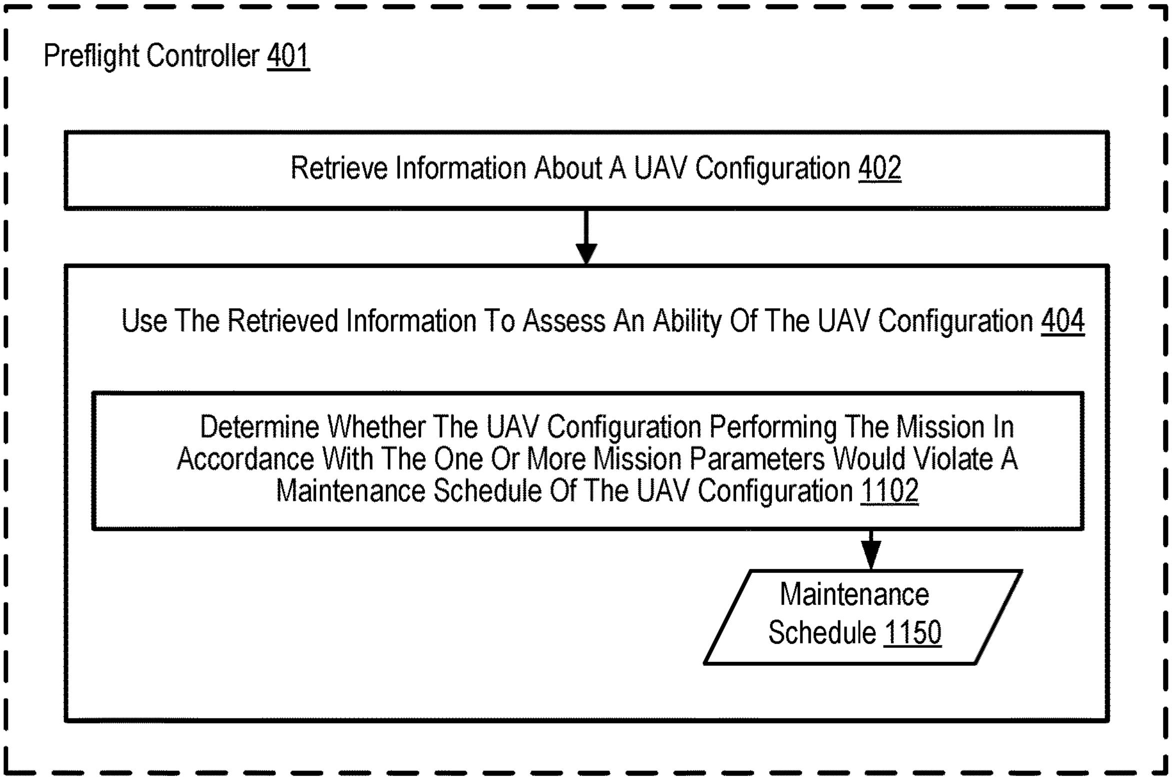
FIG. 11 is a flowchart to illustrate an implementation of a method for automated preflight evaluation of an unmanned aerial vehicle configuration, according to at least one embodiment of the present invention.

For further explanation, FIG. 11 sets forth a flow chart illustrating an exemplary method for automated preflight evaluation of an UAV configuration in accordance with at least one embodiment of the present disclosure. The method of FIG. 11 is similar to the method of FIG. 4 in that the method of FIG. 11 also includes retrieving 402, by a preflight controller 401, information 452 about a UAV configuration 450 selected to perform a mission in accordance with one or more mission parameters 454; and using 404, by the preflight controller 401, the retrieved information 452 to assess an ability of the UAV configuration 450 to perform the mission in accordance with the one or more mission parameters 454.

In the method of FIG. 11, using 404, by the preflight controller 401, the retrieved information 452 to assess an ability of the UAV configuration 450 to perform the mission in accordance with the one or more mission parameters 454 includes determining 1102 whether the UAV configuration 450 performing the mission in accordance with the one or more mission parameters 454 would violate a maintenance schedule 1150 of the UAV configuration 450. A maintenance schedule may include information about periodic service intervals, scheduled service repairs, indications of known issues or problems that need addressing, or restrictions on particular types of missions until an issue or problem is corrected. Determining 1102 whether the UAV configuration 450 performing the mission in accordance with the one or more mission parameters 454 would violate a maintenance schedule 1150 of the UAV configuration 450 may be carried out by accessing the maintenance schedule from one or more components or devices, such as a blockchain, that stores the maintenance schedule. For example, a blockchain may include a maintenance schedule for a particular UAV. In this example, the maintenance schedule may indicate that a particular UAV of the UAV configuration may have a rotor that is damaged and is scheduled for repair. Continuing with this example, the preflight controller may determine that using the particular UAV in the UAV configuration is not allowed until the particular UAV completes a service in which the rotor is repaired or replaced.

Figure 12:
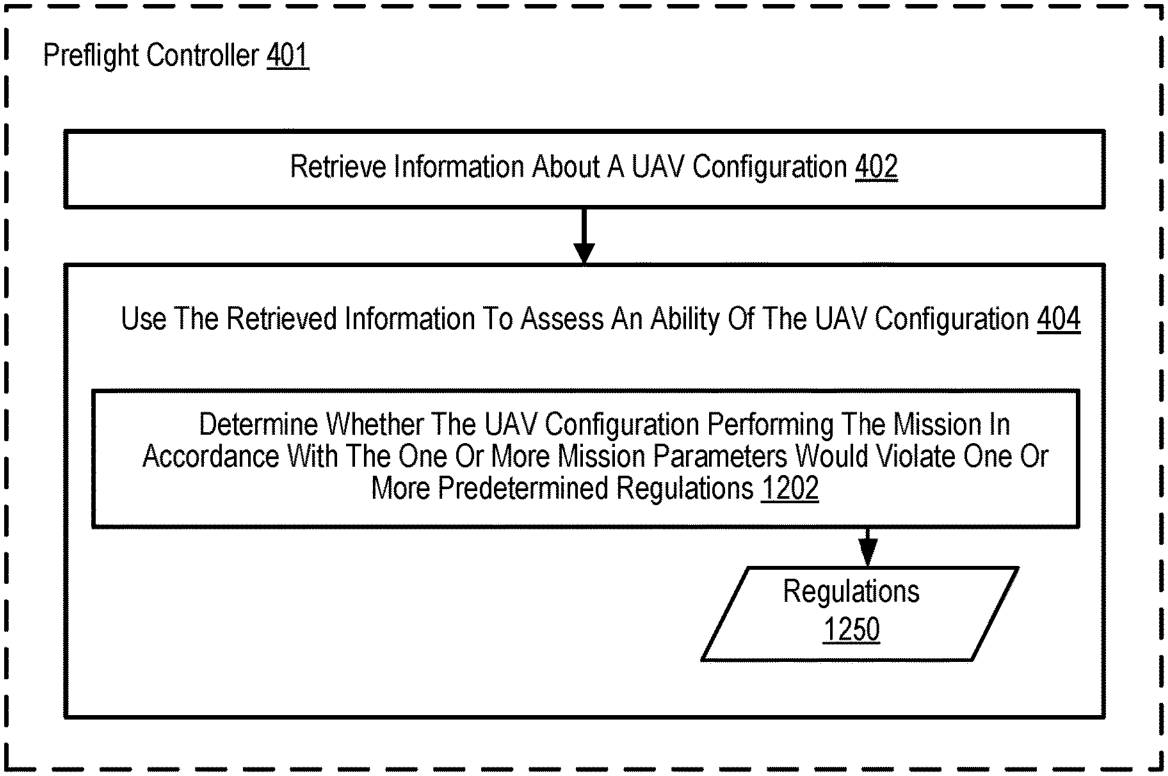
FIG. 12 is a flowchart to illustrate an implementation of a method for automated preflight evaluation of an unmanned aerial vehicle configuration, according to at least one embodiment of the present invention.

For further explanation, FIG. 12 sets forth a flow chart illustrating an exemplary method for automated preflight evaluation of an UAV configuration in accordance with at least one embodiment of the present disclosure. The method of FIG. 12 is similar to the method of FIG. 4 in that the method of FIG. 12 also includes retrieving 402, by a preflight controller 401, information 452 about a UAV configuration 450 selected to perform a mission in accordance with one or more mission parameters 454; and using 404, by the preflight controller 401, the retrieved information 452 to assess an ability of the UAV configuration 450 to perform the mission in accordance with the one or more mission parameters 454.

In the method of FIG. 12, using 404, by the preflight controller 401, the retrieved information 452 to assess an ability of the UAV configuration 450 to perform the mission in accordance with the one or more mission parameters 454 includes determining 1202 whether the UAV configuration 450 performing the mission in accordance with the one or more mission parameters 454 would violate one or more predetermined regulations 1250. Regulations may include any restrictions on UAVs or UAV missions. Examples of restrictions may include but are not limited to the types of UAV missions that are allowed over a particular area; minimum height of flights over particular areas; types of UAVs that are allowed over a particular area; and others as will occur to those of skill in the art. Determining 1202 whether the UAV configuration 450 performing the mission in accordance with the one or more mission parameters 454 would violate one or more predetermined regulations 1250 may be carried out by accessing the maintenance schedule from one or more components or devices, such as a blockchain, that store the maintenance schedule. For example, the preflight controller may access regulations from a data source (e.g., a regulatory data server or internal data structure that that includes regulations) and determine that a UAV flying over an area indicated by the mission parameters requires flying at a height of 800 feet. In this example, the preflight controller may determine that the UAV configuration has one or more UAVs that cannot fly at a height of 800 feet.

Figure 13:
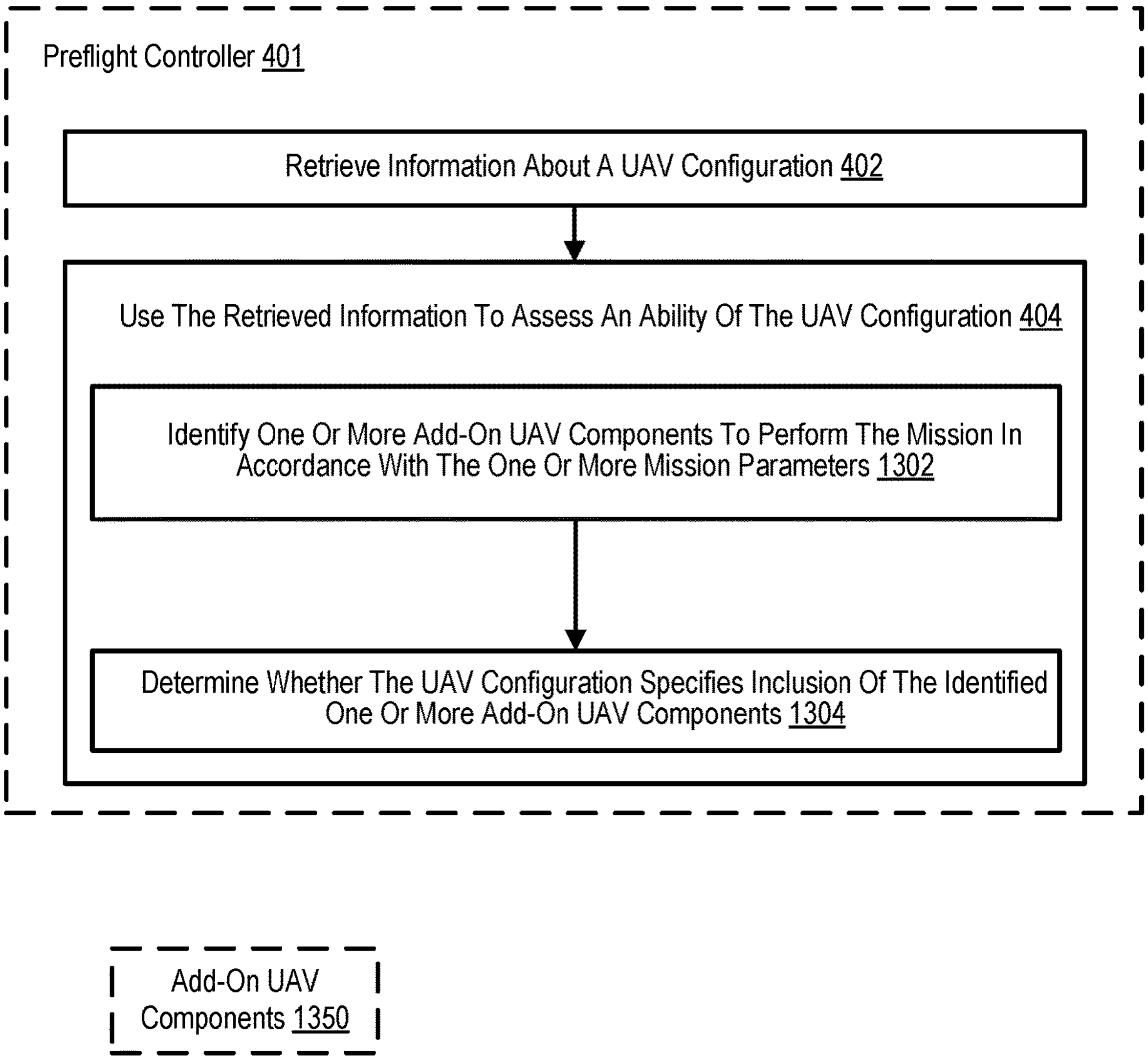
FIG. 13 is a flowchart to illustrate an implementation of a method for automated preflight evaluation of an unmanned aerial vehicle configuration, according to at least one embodiment of the present invention.

For further explanation, FIG. 13 sets forth a flow chart illustrating an exemplary method for automated preflight evaluation of an UAV configuration in accordance with at least one embodiment of the present disclosure. The method of FIG. 13 is similar to the method of FIG. 4 in that the method of FIG. 13 also includes retrieving 402, by a preflight controller 401, information 452 about a UAV configuration 450 selected to perform a mission in accordance with one or more mission parameters 454; and using 404, by the preflight controller 401, the retrieved information 452 to assess an ability of the UAV configuration 450 to perform the mission in accordance with the one or more mission parameters 454.

In the method of FIG. 13, using 404, by the preflight controller 401, the retrieved information 452 to assess an ability of the UAV configuration 450 to perform the mission in accordance with the one or more mission parameters 454 includes identifying 1302 one or more add-on UAV components 1350 to perform the mission in accordance with the one or more mission parameters 454. An add-on UAV component is hardware or software that may be added to one or more UAVs. Examples of add-on UAV components include but are not limited to software modules for object detection, image processing, or collision avoidance; hardware packages for performing specific functions, such as distance-to-object systems (e.g., radar, LIDAR) and specially designed components for lifting, carrying, or holding cargo. Identifying 1302 one or more add-on UAV components 1350 to perform the mission in accordance with the one or more mission parameters 454 may be carried out by associating a mission parameter with an add-on UAV component. For example, the one or more mission parameters may specify an object detection mission type for detecting the presence of people within an area. In this example, the preflight controller may determine that the UAV configuration may need an object detection software module for identifying people and a hardware package that includes a camera. In a particular embodiment, the preflight controller may access an index that associates a particular mission parameter with one or more add-on UAV components. In this embodiment, the preflight controller may use the index to determine which add-on UAV component to identify in response to a particular mission parameter.

According to the method of FIG. 13, using 404, by the preflight controller 401, the retrieved information 452 to assess an ability of the UAV configuration 450 to perform the mission in accordance with the one or more mission parameters 454 includes determining 1304 whether the UAV configuration 450 specifies inclusion of the identified one or more add-on UAV components 1350. Determining 1304 whether the UAV configuration 450 specifies inclusion of the identified one or more add-on UAV components 1350 may be carried out by examining the retrieved information for an identification of the identified add-on components as part of the UAV configuration.

Figure 14:
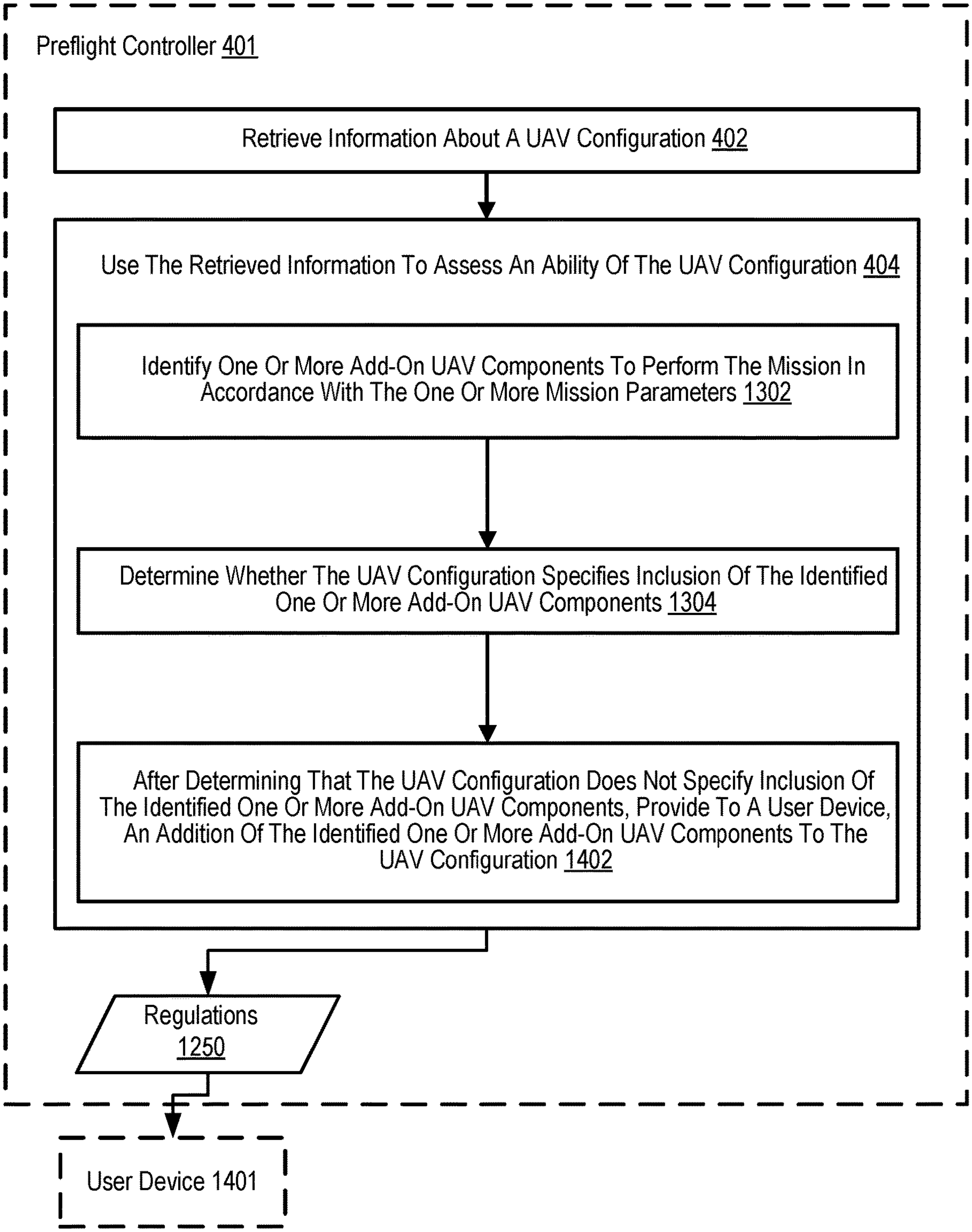
FIG. 14 is a flowchart to illustrate an implementation of a method for automated preflight evaluation of an unmanned aerial vehicle configuration, according to at least one embodiment of the present invention.

For further explanation, FIG. 14 sets forth a flow chart illustrating an exemplary method for automated preflight evaluation of an UAV configuration in accordance with at least one embodiment of the present disclosure. The method of FIG. 14 is similar to the method of FIG. 13 in that the method of FIG. 14 also includes retrieving 402, by a preflight controller 401, information 452 about a UAV configuration 450 selected to perform a mission in accordance with one or more mission parameters 454; and using 404, by the preflight controller 401, the retrieved information 452 to assess an ability of the UAV configuration 450 to perform the mission in accordance with the one or more mission parameters 454 including identifying 1302 one or more add-on UAV components 1350 to perform the mission in accordance with the one or more mission parameters 454; and determining 1304 whether the UAV configuration 450 specifies inclusion of the identified one or more add-on UAV components 1350.

However, the method of FIG. 14 also includes after determining that the UAV configuration 450 does not specify inclusion of the identified one or more add-on UAV components 1350, providing 1402 to a user device 1401, by the preflight controller 401, an addition 1450 of the identified one or more add-on UAV components 1350 to the UAV configuration 450. Providing 1402 to a user device 1401, by the preflight controller 401, an addition 1450 of the identified one or more add-on UAV components 1350 to the UAV configuration 450 may be carried out by sending data to a control device or user device for display to the user. For example, the control device or user device may display a recommendation to change the UAV configuration with the addition of the one or more add-on UAV components.

Figure 15:
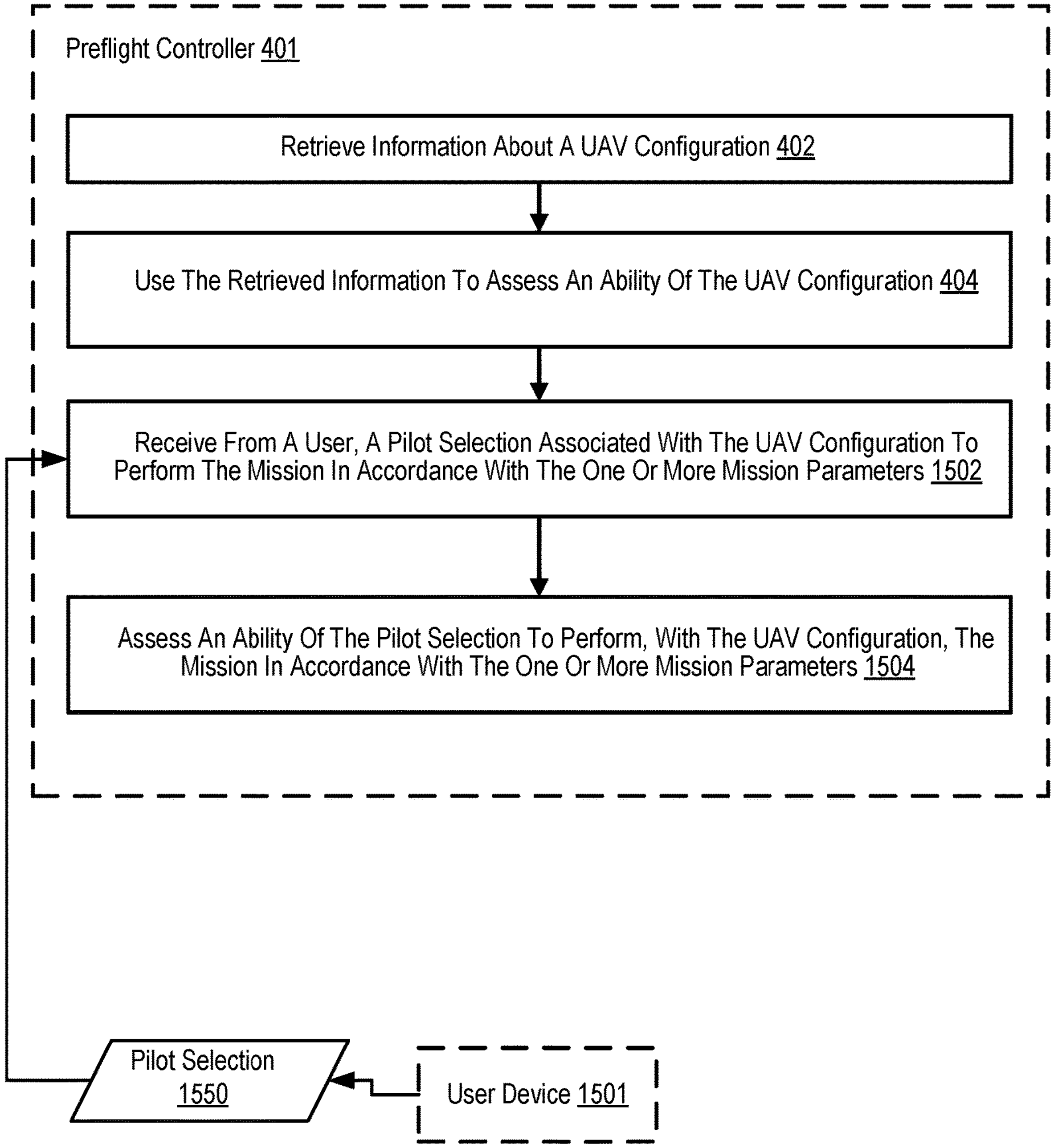
FIG. 15 is a flowchart to illustrate an implementation of a method for automated preflight evaluation of an unmanned aerial vehicle configuration, according to at least one embodiment of the present invention.

For further explanation, FIG. 15 sets forth a flow chart illustrating an exemplary method for automated preflight evaluation of an UAV configuration in accordance with at least one embodiment of the present disclosure. The method of FIG. 15 is similar to the method of FIG. 4 in that the method of FIG. 15 also includes retrieving 402, by a preflight controller 401, information 452 about a UAV configuration 450 selected to perform a mission in accordance with one or more mission parameters 454; and using 404, by the preflight controller 401, the retrieved information 452 to assess an ability of the UAV configuration 450 to perform the mission in accordance with the one or more mission parameters 454.

However, the method of FIG. 15 includes receiving 1502 from a user device 1501, by the preflight controller 401, a pilot selection 1550 associated with the UAV configuration 450 to perform the mission in accordance with the one or more mission parameters 454. A pilot selection may be an identification of a specific pilot having one or more pilot parameters or alternatively, an identification of a generic pilot having a specification of one or more pilot parameters. A pilot parameter may be information about a pilot, such as a rating, an authorization level, an experience indication, a flight history, one or more credentials, specification of UAV experience, and others as will occur to those of skill in the art. Receiving 1502 from a user device 1501, by the preflight controller 401, a pilot selection 1550 associated with the UAV configuration 450 to perform the mission in accordance with the one or more mission parameters 454 may be carried out by receiving from a control device or user device, data that indicates the selection of the pilot. For example, a control device or user device may present a graphical user interface (GUI). The GUI may present options for a user to select a pilot from a plurality of pilots or alternatively may allow a user to input a pilot identification, such as a unique pilot number. The preflight controller may be able to access data that indicates the pilot parameters for the selected pilot.

In addition, the method of FIG. 15 also includes assessing 1504, by the preflight controller 401, an ability of the pilot selection 1550 to perform, with the UAV configuration 450, the mission in accordance with the one or more mission parameters 454. Assessing 1504, by the preflight controller 401, an ability of the pilot selection 1550 to perform, with the UAV configuration 450, the mission in accordance with the one or more mission parameters 454 may be carried out by examining the pilot parameters associated with the selected pilot; and determining whether the pilot parameters satisfy one or more mission parameters. For example, the one or more mission parameters may specify flying at night and flying a specific type of UAV. In this example, the preflight controller may examine the pilot parameters for the selected pilot to determine if the pilot is authorized to fly at night and has experience flying the specific type of UAV. Continuing with this example, if the pilot is not authorized to fly at night or does not have experience flying the specific type of UAV, the preflight controller may determine that the pilot selection does not have the ability to perform, with the UAV configuration, the mission in accordance with the one or more mission parameters.

Figure 16:
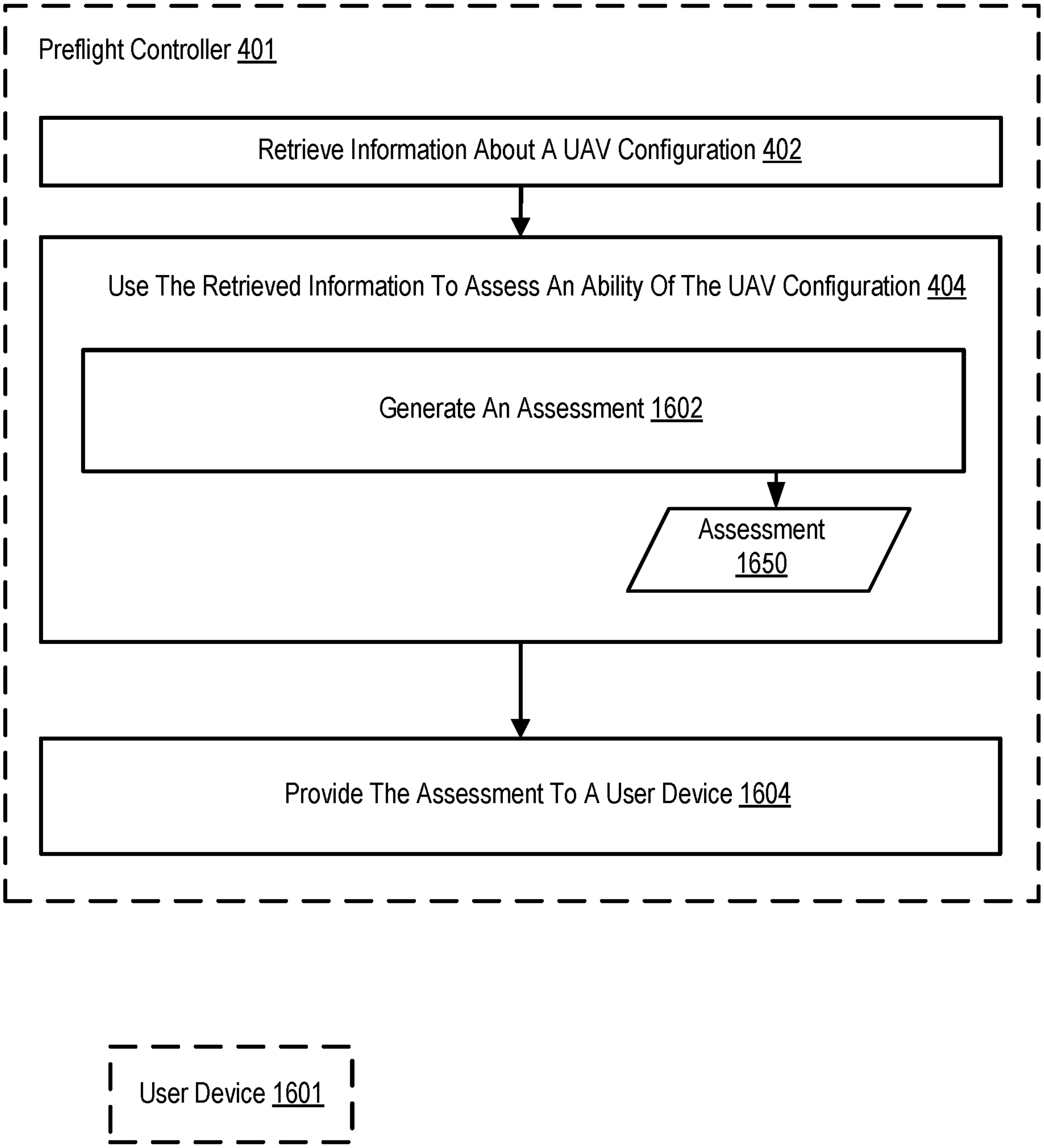
FIG. 16 is a flowchart to illustrate an implementation of a method for automated preflight evaluation of an unmanned aerial vehicle configuration, according to at least one embodiment of the present invention.

For further explanation, FIG. 16 sets forth a flow chart illustrating an exemplary method for automated preflight evaluation of an UAV configuration in accordance with at least one embodiment of the present disclosure. The method of FIG. 16 is similar to the method of FIG. 4 in that the method of FIG. 16 also includes retrieving 402, by a preflight controller 401, information 452 about a UAV configuration 450 selected to perform a mission in accordance with one or more mission parameters 454; and using 404, by the preflight controller 401, the retrieved information 452 to assess an ability of the UAV configuration 450 to perform the mission in accordance with the one or more mission parameters 454.

In the method of FIG. 16 using 404, by the preflight controller 401, the retrieved information 452 to assess an ability of the UAV configuration 450 to perform the mission in accordance with the one or more mission parameters 454 includes generating 1602 an assessment 1650. An assessment may be any data that indicates the results of preflight controller assessing the ability of the UAV configuration to perform the mission. Examples of assessments that may be generated by the preflight controller may include but are not limited to data indicating a binary pass/failure, a rating, a probability of success, a probability of failure, and others as will occur to those of skill in the art. Generating 1602 an assessment 1650 may be carried out by generating a report, an alert, a message, a text.

In addition, the method of FIG. 16 also includes providing 1604, by the preflight controller 401, the assessment 1650 to a user device 1601. Providing 1604, by the preflight controller 401, the assessment 1650 to a user device 1601 may be carried out by transmitting the assessment to a user device or control device. For example, the preflight controller may transmit to a user device or control device, data associated with the assessment. In this example, the user device or control device may present to the user via a graphical user interface, information related to the assessment.

Figure 17:
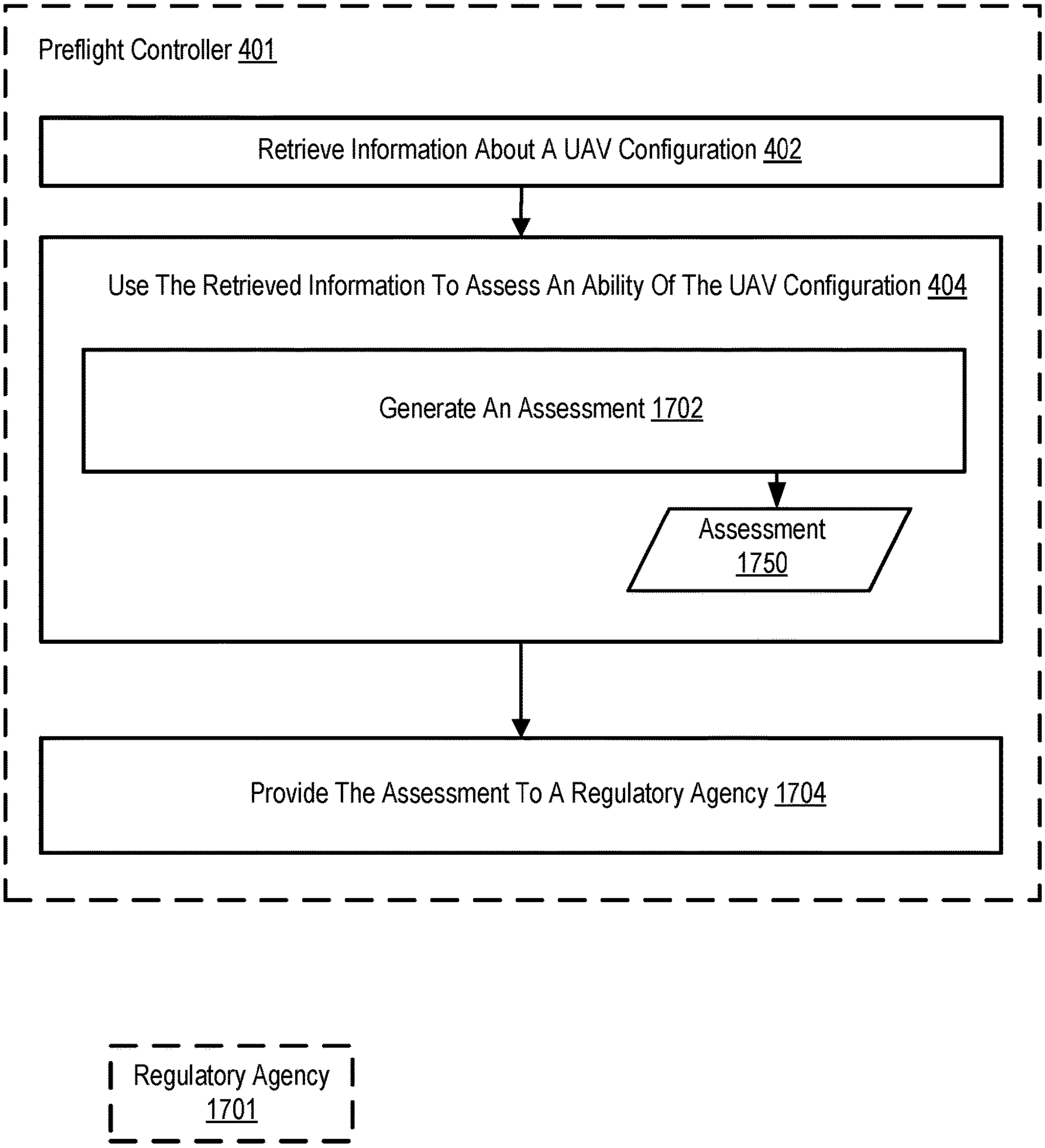
FIG. 17 is a flowchart to illustrate an implementation of a method for automated preflight evaluation of an unmanned aerial vehicle configuration, according to at least one embodiment of the present invention.

For further explanation, FIG. 17 sets forth a flow chart illustrating an exemplary method for automated preflight evaluation of an UAV configuration in accordance with at least one embodiment of the present disclosure. The method of FIG. 17 is similar to the method of FIG. 4 in that the method of FIG. 17 also includes retrieving 402, by a preflight controller 401, information 452 about a UAV configuration 450 selected to perform a mission in accordance with one or more mission parameters 454; and using 404, by the preflight controller 401, the retrieved information 452 to assess an ability of the UAV configuration 450 to perform the mission in accordance with the one or more mission parameters 454.

In the method of FIG. 17 using 404, by the preflight controller 401, the retrieved information 452 to assess an ability of the UAV configuration 450 to perform the mission in accordance with the one or more mission parameters 454 includes generating 1702 an assessment 1750. An assessment may be any data that indicates the results of preflight controller assessing the ability of the UAV configuration to perform the mission. Examples of assessments that may be generated by the preflight controller may include but are not limited to data indicating a binary pass/failure, a rating, a probability of success, a probability of failure, and others as will occur to those of skill in the art. Generating 1702 an assessment 1750 may be carried out by generating a report, an alert, a message, a text.

In addition, the method of FIG. 17 also includes providing 1704, by the preflight controller 401, the assessment 1750 to a regulatory agency 1701. A regulatory agency may be a computer system that regulates, authorizes, controls, or insures UAV missions. Examples of regulatory agencies include government systems (e.g., FAA computer systems), air traffic control systems, UAV traffic management systems, private companies, and insurance companies. Providing 1704, by the preflight controller 401, the assessment 1750 to a regulatory agency 1701 may be carried out by electronically transmitting the assessment to the regulatory agency. For example, a regulatory agency may be an FAA computer system that is configured to approve flight plans for missions. In this example, the FAA computer system may receive assessments related to proposed UAV configurations for performing a particular mission. Continuing with this example, the FAA computer system may use the received assessment to determine whether the UAV configuration is approved to fly the mission.

Figure 18:
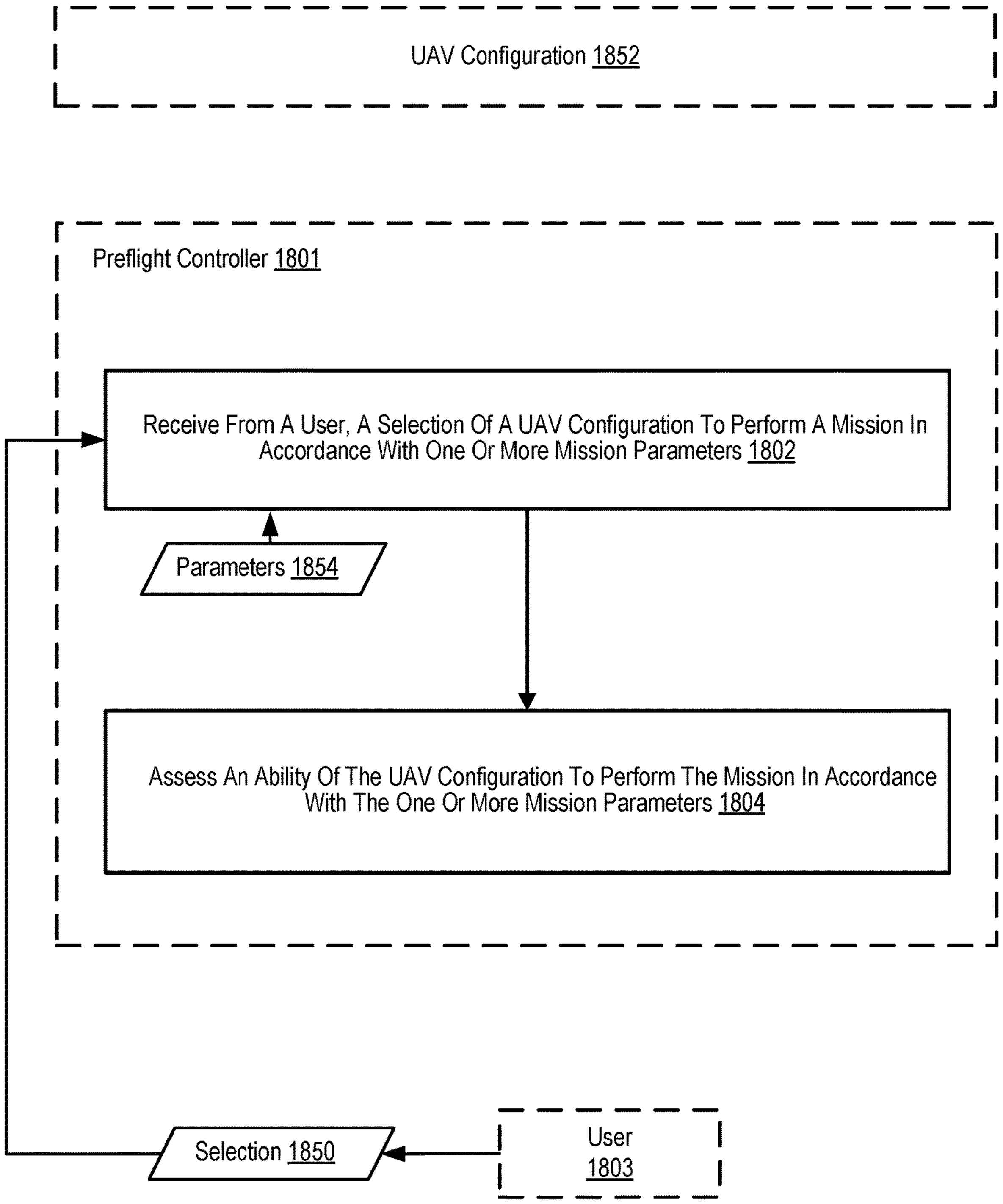
FIG. 18 is a flowchart to illustrate an implementation of a method for automated preflight evaluation of an unmanned aerial vehicle configuration, according to at least one embodiment of the present invention.

For further explanation, FIG. 18 sets forth a flow chart illustrating an exemplary method for automated preflight evaluation of an UAV configuration in accordance with at least one embodiment of the present disclosure. The method of FIG. 18 includes receiving 1802 from a user 1803, by a preflight controller 1801, a selection 1850 of a UAV configuration 1852 to perform a mission in accordance with one or more mission parameters 1854. The preflight controller 1801 of FIG. 18 may be the preflight controller 139 of FIGS. 1 and 2 and the preflight controller 145 of FIG. 1.

A UAV configuration is a configuration, set, or collection of one or more UAVs. In a particular embodiment, the one or more UAVs of the UAV configuration may be particular UAVs. For example, a UAV configuration may include a particular UAV that is in a UAV's fleet of UAVs. Alternatively, the UAV configuration may not be any one particular UAV and instead may be unspecified or generic UAVs having particular specifications. For example, a UAV configuration may include a generic UAV having particular specifications, such as a particular rating, a particular maximum range, a particular maximum speed, a particular cargo capacity, and a particular availability. In this example, the generic UAVs of this UAV configuration may be fulfilled or implemented by any particular UAV matching the particular specifications of the UAV configuration. Information about a UAV configuration may include any data indicating information associated with the UAV configuration. Examples of information about a UAV configuration include but are not limited to information identifying the particular UAVs of the UAV configuration; and information indicating the specifications of any generic UAVs.

A mission is a flight operation carried out by one or more UAVs and defined by one or more mission parameters. Mission parameters may be any form of data, value, condition, or rule that can be used to explain, limit, or define some aspect of a mission. Examples of mission parameters include but are not limited to time and date constraints for starting, finishing, or completing the mission; size of a payload or package to be delivered; type of hardware to be included on the UAV; type of software to be included on the UAV; type of mission to be performed (e.g., surveillance mission, free flight mission, search mission, etc.); UAV rating (e.g., the user may require a UAV having a particular weather rating, a particular payload rating, a particular distance rating, a particular max flying height rating, a type of payload rating, and a mission type rating); and pilot rating (e.g., the user may require a pilot of a particular experience level (type of mission experience, total flying hours completed by the pilot, type of UAV experience) to fly the mission). For example, the user may input into a GUI a request for a mission to deliver a payload of a particular size from location 1 to location 2 on a particular day by a particular time, by a pilot with particular credentials, using a UAV that is capable of carrying loads up to a certain amount.

Receiving 1802 from a user 1803, by a preflight controller 1801, a selection 1850 of a UAV configuration 1852 to perform a mission in accordance with one or more mission parameters 1854 may be carried out by receiving from a user device, a selection that was input into the user device by the user.

In addition, the method of FIG. 18 includes assessing 1804, by the preflight controller 1801, an ability of the UAV configuration 1852 to perform the mission in accordance with the one or more mission parameters 1854. As explained above, the mission parameters specify and define what must be accomplished by the UAV configuration to perform the mission. The preflight controller uses the information about the UAV configuration to determine the ability of the particular UAV configuration to perform the mission in accordance with the one or more mission parameters. Assessing 1804, by the preflight controller 1801, an ability of the UAV configuration 1852 to perform the mission in accordance with the one or more mission parameters 1854 may be carried out by identifying a specification in the information and comparing the identified specification with an associated mission parameter; identifying a specification of a particular UAV listed in the information and comparing the identified specification with an associated mission parameters; and determining whether the identified specification satisfies the mission parameter.

For example, the information about the UAV configuration may specify that the UAV configuration includes a UAV that has a range of 10 miles. Continuing with this example, the mission parameters may require a range of 20 miles. In this example, the preflight controller may determine that the UAV configuration does not have the ability to perform the mission in accordance with the one or more mission parameters. As another example, the information about the UAV configuration may specify that the UAV configuration includes a UAV with a cargo capacity of 3 pounds, but the mission parameters require transport of a 5-pound cargo. In this example, the preflight controller may determine that the UAV configuration does not have the ability to perform the mission in accordance with the one or more mission parameters.

In a particular embodiment, assessing 1804, by the preflight controller 1801, an ability of the UAV configuration 1852 to perform the mission in accordance with the one or more mission parameters 1854 may be carried out by determining for UAV configurations having similar specifications a historical success rate of performing missions with similar mission parameters; determining, based on the historical success rate, an assessment of the ability of the UAV configuration to perform the mission.

For example, the information about the UAV configuration may specify that the UAV has a range of 10 miles and the mission parameters may require a range of 8 miles over a particular area. In this example, the preflight controller may determine that historically UAVs with specified ranges of 10 miles have only an 80% success rate of completing missions that require a range of 8 miles over the particular area. Continuing with this example, the preflight controller may assess the ability of the UAV configuration at 80%.

Exemplary embodiments of the present invention are described largely in the context of a fully functional computer system for utilizing an unmanned aerial vehicle to perform an action in response to detection of an object. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Hardware logic, including programmable logic for use with a programmable logic device (PLD) implementing all or part of the functionality previously described herein, may be designed using traditional manual methods or may be designed, captured, simulated, or documented electronically using various tools, such as Computer Aided Design (CAD) programs, a hardware description language (e.g., VHDL or Verilog), or a PLD programming language. Hardware logic may also be generated by a non-transitory computer readable medium storing instructions that, when executed by a processor, manage parameters of a semiconductor component, a cell, a library of components, or a library of cells in electronic design automation (EDA) software to generate a manufacturable design for an integrated circuit. In implementation, the various components described herein might be implemented as discrete components or the functions and features described can be shared in part or in total among one or more components. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for automated preflight evaluation of an unmanned aerial vehicle (UAV) configuration, the method comprising:

retrieving, by a preflight controller associated with a device, information about a UAV configuration selected to perform a mission in accordance with one or more mission parameters, wherein at least a portion of information associated with the UAV configuration is retrieved using a blockchain comprising blockchain data, wherein the blockchain is configured with computer program instructions that when executed by a processor causes the processor to receive a request for information regarding the UAV configuration and in response to the request retrieve data associated with the requested information, and wherein a block of the blockchain is configured to verify integrity of the blockchain data based on at least information of a previous block hash included in the block;

using, by the preflight controller, the retrieved information to assess an ability of the UAV configuration to perform the mission in accordance with the one or more mission parameters;

identifying an alternative UAV configuration based on the assessment of the ability of the UAV configuration to perform the mission in accordance with the one or more mission parameters; and broadcasting, to a network associated with the UAV, the preflight controller, and the blockchain, a transaction message that includes the alternative UAV configuration, wherein a blockchain manager of the blockchain retrieves the transaction message from the network and stores information related to the transaction message in the blockchain, wherein data transmitted from the device is encrypted based on a private key associated with the device, and wherein a message received by the device is decrypted based on a public key associated with the device.

2. The method of claim 1 wherein using, by the preflight controller, the retrieved information to assess an ability of the UAV configuration to perform the mission in accordance with the one or more mission parameters includes:

determining one or more UAV operational requirements to perform the mission in accordance with the one or more mission parameters;

determining a first set of operational limitations of the UAV configuration; and determining whether the first set of operational limitations of the UAV configuration satisfy the one or more UAV operational requirements.

3. The method of claim 2 further comprising:

after determining that the first set of operational limitations of the UAV configuration do not satisfy the one or more UAV operational requirements:

identifying, by the preflight controller, an alternative UAV configuration having a second set of operational limitations that satisfy the one or more UAV operational requirements; and providing to a user device, by the preflight controller, second information about the alternative UAV configuration.

4. The method of claim 2 further comprising:

after determining that the first set of operational limitations of the UAV configuration do not satisfy the one or more UAV operational requirements:

identifying, by the preflight controller, changes to the one or more mission parameters, the changes associated with updated UAV operational requirements that satisfy the first set of operational limitations of the UAV configuration; and providing to a user device, by the preflight controller, the changes to the one or more mission parameters.

5. The method of claim 1 wherein using, by the preflight controller, the retrieved information to assess an ability of the UAV configuration to perform the mission in accordance with the one or more mission parameters includes:

using the one or more mission parameters to identify environmental information for the mission;

using the environmental information to determine one or more UAV operational requirements for one or more UAVs to perform the mission;

determining a first set of operational limitations of the UAV configuration; and determining whether the first set of operational limitations of the UAV configuration satisfy the one or more UAV operational requirements.

6. The method of claim 5 further comprising:

after determining that the first set of operational limitations of the UAV configuration do not satisfy the one or more UAV operational requirements:

identifying, by the preflight controller, an alternative UAV configuration having a second set of operational limitations that satisfy the one or more UAV operational requirements; and providing to a user device, by the preflight controller, second information about the alternative UAV configuration.

7. The method of claim 5 further comprising:

receiving, by the preflight controller, updated environmental information for the mission; and using, by the preflight controller, the updated environmental information to reassess the ability of the UAV configuration to perform the mission in accordance with the one or more mission parameters.

8. The method of claim 1 wherein using, by the preflight controller, the retrieved information to assess an ability of the UAV configuration to perform the mission in accordance with the one or more mission parameters includes:

determining whether the UAV configuration performing the mission in accordance with the one or more mission parameters would violate a maintenance schedule of the UAV configuration.

9. The method of claim 1 wherein using, by the preflight controller, the retrieved information to assess an ability of the UAV configuration to perform the mission in accordance with the one or more mission parameters includes:

determining whether the UAV configuration performing the mission in accordance with the one or more mission parameters would violate one or more predetermined regulations.

10. The method of claim 1 wherein using, by the preflight controller, the retrieved information to assess an ability of the UAV configuration to perform the mission in accordance with the one or more mission parameters includes:

identifying one or more add-on UAV components to perform the mission in accordance with the one or more mission parameters; and determining whether the UAV configuration specifies inclusion of the identified one or more add-on UAV components.

11. The method of claim 10 further comprising:

after determining that the UAV configuration does not specify inclusion of the identified one or more add-on UAV components, providing to a user device, by the preflight controller, an addition of the identified one or more add-on UAV components to the UAV configuration.

12. The method of claim 1 further comprising:

receiving from a user, by the preflight controller, a pilot selection associated with the UAV configuration to perform the mission in accordance with the one or more mission parameters; and assessing, by the preflight controller, an ability of the pilot selection to perform, with the UAV configuration, the mission in accordance with the one or more mission parameters.

13. The method of claim 1 wherein using, by the preflight controller, the retrieved information to assess an ability of the UAV configuration to perform the mission in accordance with the one or more mission parameters includes generating an assessment; and the method further comprising providing, by the preflight controller, the assessment to a user.

14. A method for automated preflight evaluation of an unmanned aerial vehicle (UAV) configuration, the method comprising:

receiving from a user, by a preflight controller associated with a device, a selection of a UAV configuration to perform a mission in accordance with one or more mission parameters;

assessing, by the preflight controller and based on information related to the UAV configuration, an ability of the UAV configuration to perform the mission in accordance with the one or more mission parameters, wherein at least a portion of the information is retrieved using a blockchain, wherein the blockchain is configured with computer program instructions that when executed by a processor cause the processor to receive a request for information regarding the UAV and in response to the request retrieve from the blockchain, data associated with the requested information, and wherein a block of the blockchain is configured to verify integrity of blockchain data based on at least information of a previous block hash included in the block;

identifying an alternative UAV configuration based on the assessment of the ability of the UAV configuration to perform the mission in accordance with the one or more mission parameters; and broadcasting, to a network associated with the UAV, the preflight controller, and the blockchain, a transaction message that includes the alternative UAV configuration, wherein a blockchain manager of the blockchain retrieves the transaction message from the network and stores information related to the transaction message in the blockchain, wherein data transmitted from the device is encrypted based on a private key associated with the device, and wherein a message received by the device is decrypted based on a public key associated with the device.

15. An apparatus for automated preflight evaluation of an unmanned aerial vehicle (UAV) configuration, the apparatus comprising:

a processor; and a non-transitory computer readable medium storing instructions that when executed by the processor, cause the apparatus to carry out operations including:

retrieving, by a preflight controller associated with a device, information about a UAV configuration selected to perform a mission in accordance with one or more mission parameters, wherein at least a portion of the information is retrieved using a blockchain, wherein the blockchain is configured with computer program instructions that when executed by a processor cause the processor to receive a request for information regarding the UAV and in response to the request retrieve from the blockchain, data associated with the requested information, and wherein a block of the blockchain is configured to verify integrity of blockchain data based on at least information of a previous block hash included in the block;

using, by the preflight controller, the retrieved information to assess an ability of the UAV configuration to perform the mission in accordance with the one or more mission parameters;

identifying an alternative UAV configuration based on the assessment of the ability of the UAV configuration to perform the mission in accordance with the one or more mission parameters; and broadcasting, to a network associated with the UAV, the preflight controller, and the blockchain, a transaction message that includes the alternative UAV configuration, wherein a blockchain manager of the blockchain retrieves the transaction message from the network and stores information related to the transaction message in the blockchain, wherein data transmitted from the device is encrypted based on a private key associated with the device, and wherein a message received by the device is decrypted based on a public key associated with the device.

16. The apparatus of claim 15 wherein using, by the preflight controller, the retrieved information to assess an ability of the UAV configuration to perform the mission in accordance with the one or more mission parameters includes:

determining one or more UAV operational requirements to perform the mission in accordance with one or more mission parameters;

determining a first set of operational limitations of the UAV configuration; and determining whether the first set of operational limitations of the UAV configuration satisfy the one or more UAV operational requirements.

17. The apparatus of claim 15 wherein using, by the preflight controller, the retrieved information to assess an ability of the UAV configuration to perform the mission in accordance with the one or more mission parameters includes:

identifying one or more add-on UAV components to perform the mission in accordance with the one or more mission parameters; and determining whether the UAV configuration specifies inclusion of the identified one or more add-on UAV components.

18. A computer program product for automated preflight evaluation of an unmanned aerial vehicle (UAV) configuration, the computer program product disposed upon a non-transitory computer readable medium, the computer program product comprising computer program instructions that, when executed, cause a computer to carry out operations of:

retrieving, by a preflight controller associated with a device, information about a UAV configuration selected to perform a mission in accordance with one or more mission parameters, wherein the information includes the UAV configuration, wherein at least a portion of the information is retrieved using a blockchain, wherein the blockchain is configured with computer program instructions that when executed by a processor causes the processor to receive a request for information regarding the UAV and in response to the request retrieve from the blockchain, data associated with the requested information, and wherein a block of the blockchain is configured to verify integrity of blockchain data based on at least information of a previous block hash included in the block;

using, by the preflight controller, the retrieved information to assess an ability of the UAV configuration to perform the mission in accordance with the one or more mission parameters;

identifying an alternative UAV configuration based on the assessment of the ability of the UAV configuration to perform the mission in accordance with the one or more mission parameters; and broadcasting, to a network associated with the UAV, the preflight controller, and the blockchain, a transaction message that includes the alternative UAV configuration, wherein a blockchain manager of the blockchain retrieves the transaction message from the network and stores information related to the transaction message in the blockchain, wherein data transmitted from the device is encrypted based on a private key associated with the device, and wherein a message received by the device is decrypted based on a public key associated with the device.

19. The computer program product of claim 18 wherein using, by the preflight controller, the retrieved information to assess an ability of the UAV configuration to perform the mission in accordance with the one or more mission parameters includes:

determining one or more UAV operational requirements to perform the mission in accordance with one or more mission parameters;

determining a first set of operational limitations of the UAV configuration; and determining whether the first set of operational limitations of the UAV configuration satisfy the one or more UAV operational requirements.

20. The method of claim 1, wherein the blockchain manager is configured to receive another transaction message that is broadcast by the UAV and store information associated with the other transaction message in the blockchain, and wherein data sent by the UAV is encrypted using another private key associated with the UAV and wherein data received by the UAV is decrypted using another public key.

* * * * *